(12) United States Patent
Watanabe et al.

(10) Patent No.: US 12,431,102 B2
(45) Date of Patent: Sep. 30, 2025

(54) DISPLAY DEVICE

(71) Applicant: Sharp Display Technology Corporation, Kameyama (JP)

(72) Inventors: Hisashi Watanabe, Kameyama (JP); Hirotoshi Yasunaga, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 18/648,234

(22) Filed: Apr. 26, 2024

(65) Prior Publication Data

US 2024/0412701 A1  Dec. 12, 2024

(30) Foreign Application Priority Data

Jun. 8, 2023  (JP) .................................. 2023-094965

(51) Int. Cl.
| | |
|---|---|
| G09G 3/34 | (2006.01) |
| F21V 8/00 | (2006.01) |
| G02F 1/1333 | (2006.01) |
| G02F 1/13357 | (2006.01) |
| G09G 3/36 | (2006.01) |

(52) U.S. Cl.
CPC ......... G09G 3/3426 (2013.01); G02B 6/0088 (2013.01); G02F 1/133308 (2013.01); G02F 1/133603 (2013.01); G02F 1/133611 (2013.01); *G09G 3/36* (2013.01); *G09G 2320/0238* (2013.01); *G09G 2320/0626* (2013.01)

(58) Field of Classification Search
CPC ................... G09G 3/3426; G09G 3/36; G09G 2320/0238; G09G 2320/0626; G02B 6/0088; G02F 1/133308; G02F 1/133603; G02F 1/133611; G02F 1/133615
See application file for complete search history.

(56) References Cited

U.S. PATENT DOCUMENTS

| | | | |
|---|---|---|---|
| 2002/0054440 A1 | 5/2002 | Akamine et al. | |
| 2009/0288756 A1* | 11/2009 | Dunn ................ | B32B 17/10954 156/107 |
| 2015/0253884 A1* | 9/2015 | Hwang ................... | G06F 3/041 345/173 |
| 2017/0113612 A1* | 4/2017 | Taguchi ................... | G09G 5/00 |
| 2018/0130425 A1* | 5/2018 | Choi ...................... | G09G 3/342 |

(Continued)

FOREIGN PATENT DOCUMENTS

| | | |
|---|---|---|
| JP | 2001-331132 A | 11/2001 |
| JP | 5725581 B1 | 5/2015 |
| JP | 6696014 B2 | 5/2020 |

*Primary Examiner* — Towfiq Elahi
(74) *Attorney, Agent, or Firm* — ScienBiziP, P.C.

(57) ABSTRACT

Provided is a display device in which a boundary between a display area and a frame area is less noticeable even when a liquid crystal panel is in a black display state. A display device includes: a liquid crystal panel and a backlight. The liquid crystal panel includes: a display area; and a frame area, the front surface plate includes a design layer that overlaps the display area and is configured to transmit at least a part of light incident from the liquid crystal panel and to reflect at least a part of light incident from the observer side, the backlight includes: a third area that overlaps the display area; and a fourth area that overlaps the display area, and a luminance of the fourth area is 50% or less of a luminance of the third area when the backlight is turned on.

4 Claims, 12 Drawing Sheets

(56) References Cited

U.S. PATENT DOCUMENTS

| | | | |
|---|---|---|---|
| 2019/0107665 A1* | 4/2019 | Bu | G02B 6/005 |
| 2021/0012727 A1* | 1/2021 | Chang | G09G 3/3426 |
| 2021/0178733 A1 | 6/2021 | Yamanaka et al. | |
| 2023/0015959 A1* | 1/2023 | Yoshida | G02F 1/133514 |

\* cited by examiner

Frame area   Display area   Frame area

300

(ii)   (i)   (ii)   110

111

113

DISPLAY DEVICE

The present application claims priority under 35 U.S.C. § 119 to Japanese Patent Application No. 2023-094965 filed on Jun. 8, 2023, the contents of which are incorporated herein by reference in their entirety.

BACKGROUND OF THE INVENTION

Field of the Invention

The present disclosure relates to a display device.

Description of the Related Art

In recent years, with respect to a display device that displays a desired image when a display screen is turned on, it has been studied to improve designability by the following manner. When the display panel such as a liquid crystal panel is turned off, the display panel is made inconspicuous by making the display panel harmonized with surrounding members, casings, and the like. As a method of making the display screen inconspicuous when a display panel is turned off, the following method has been studied, for example. The following member is disposed on a front surface side of the display panel: a printed matter containing an interference pigment; or a semi-transmissive member such as a screen or a decorative film that transmits a part of light (for example, JP 5725581 B, JP 2001-331132 A, JP 6696014 B, and other patent documents).

JP 5725581 B discloses a printed matter including: a base film; a first color pattern layer provided on the base film and constituted by a plurality of first color dots; a second color pattern layer provided on the first color pattern layer and constituted by a plurality of second color dots; and a third color pattern layer provided on the second color pattern layer and constituted by a plurality of third color dots, wherein each of the first color dots includes a first color binder and a plurality of first color pigment chips dispersed inside the first color binder, each of the second color dots includes a second color binder and a plurality of second color pigment chips dispersed inside the second color binder, each of the third color dots includes a third color binder and a plurality of third color pigment chips dispersed in the third color binder, and the first color pigment chips, the second color pigment chips, and the third color pigment chips are respective ones of a red interference pigment, a green interference pigment, and a blue interference pigment.

JP 2001-331132 A discloses a display device including a display that is fitted in an attachment portion and emits display light to the outside when turned on, wherein a front surface of the display is covered with a screen including a large number of fine holes capable of transmitting display light, and a surface of the screen is set to the same color and pattern as the attachment portion surrounding the display.

JP 6696014 B discloses a decorative-sheet-equipped display device that includes: a display device including a display surface; and a decorative sheet provided to face the display surface. The decorative sheet includes: a pattern portion; and a plurality of transmission portions on which the pattern portion is not formed, the decorative sheet has an aperture ratio of 5% or more and 50% or less, the transmission portions are formed such that a distance between the transmission portions adjacent to each other is 40 μm or more and 140 μm or less, the display device is a dot-matrix liquid crystal display, and a pitch of the transmission portions is larger than a pitch of pixels on the display surface.

BRIEF SUMMARY OF THE INVENTION

In a display device that includes a liquid crystal panel and a backlight on the back surface side of the liquid crystal panel, the liquid crystal panel slightly transmits backlight light even in a black display state; therefore, even when black is displayed in a display area, the black in the display area may appear slightly brighter than perfect black (black floating).

The present invention has been made in view of the above circumstances, and an object of the present invention is to provide a display device in which a boundary between a display area and a frame area is less noticeable even when a liquid crystal panel displays black.

(1) In an embodiment of the present invention, a display device includes: a liquid crystal panel; a front surface plate disposed on an observer side of the liquid crystal panel; and a backlight disposed on a back surface side of the liquid crystal panel. The liquid crystal panel includes, in plan view: a display area; and a frame area disposed around the display area, the front surface plate includes a design layer that overlaps the display area in plan view, and is configured to transmit at least a part of light incident from the liquid crystal panel and to reflect at least a part of light incident from the observer side, the backlight includes, in plan view: a third area that overlaps the display area of the liquid crystal panel; and a fourth area that overlaps the display area of the liquid crystal panel and is disposed around the third area, and a luminance of the fourth area is 50% or less of a luminance of the third area when the backlight is turned on.

(2) In an embodiment of the present invention, the display device includes the structure (1), the backlight is a direct type backlight in which a plurality of light emitting elements are arranged in a matrix, and the display device further includes a luminance adjustment mechanism that adjusts a luminance of the backlight, wherein the luminance adjustment mechanism adjusts a light emission intensity of each of the plurality of light emitting elements in accordance with a display image of the liquid crystal panel.

(3) In an embodiment of the present invention, the display device includes the structure (1), the backlight is an edge light type backlight including: a light guide plate; and a light emitting element disposed on a side surface of the light guide plate, and a reflectance of an area, on the light guide plate, overlapping the fourth area, is lower than a reflectance of an area overlapping the third area.

(4) In an embodiment of the present invention, a display device includes: a liquid crystal panel; a front surface plate disposed on an observer side of the liquid crystal panel; and a backlight disposed on a back surface side of the liquid crystal panel. The liquid crystal panel includes, in plan view: a display area; and a frame area disposed around the display area. The front surface plate includes a design layer that overlaps the display area in plan view, and is configured to transmit at least a part of light incident from the liquid crystal panel and to reflect at least a part of light incident from the observer side, and a difference between a luminance of the display area of the liquid crystal panel and a luminance of the frame area in a black display state is 5% or less under 500 to 1000 lux.

(5) In an embodiment of the present invention, the display device includes the structure (4) and further includes a luminance adjustment mechanism that adjusts a luminance of the backlight, and the luminance adjustment mechanism performs control such that the backlight is turned on constantly in reflection display in which light incident from the observer side is reflected to allow an observer to visually recognize a pattern of the design layer.

(6) In an embodiment of the present invention, the display device includes the structure (5), and the liquid crystal panel is in a transmission state in the reflection display.

(7) In an embodiment of the present invention, the display device includes any one of the structures (1) to (6), and a transmittance of an area, of the front surface plate, overlapping the display area is 50% or more.

(8) In an embodiment of the present invention, the display device includes any one of the structures (1) to (7), and the front surface plate and the liquid crystal panel are bonded to each other by an optical adhesion layer.

(9) In an embodiment of the present invention, the display device includes the structure (8), and the optical adhesion layer has a refractive index of 1.4 or more and 1.6 or less.

The present invention can provide a display device with reduced interface reflection and high luminance.

DETAILED DESCRIPTION OF THE INVENTION

Figure 1:
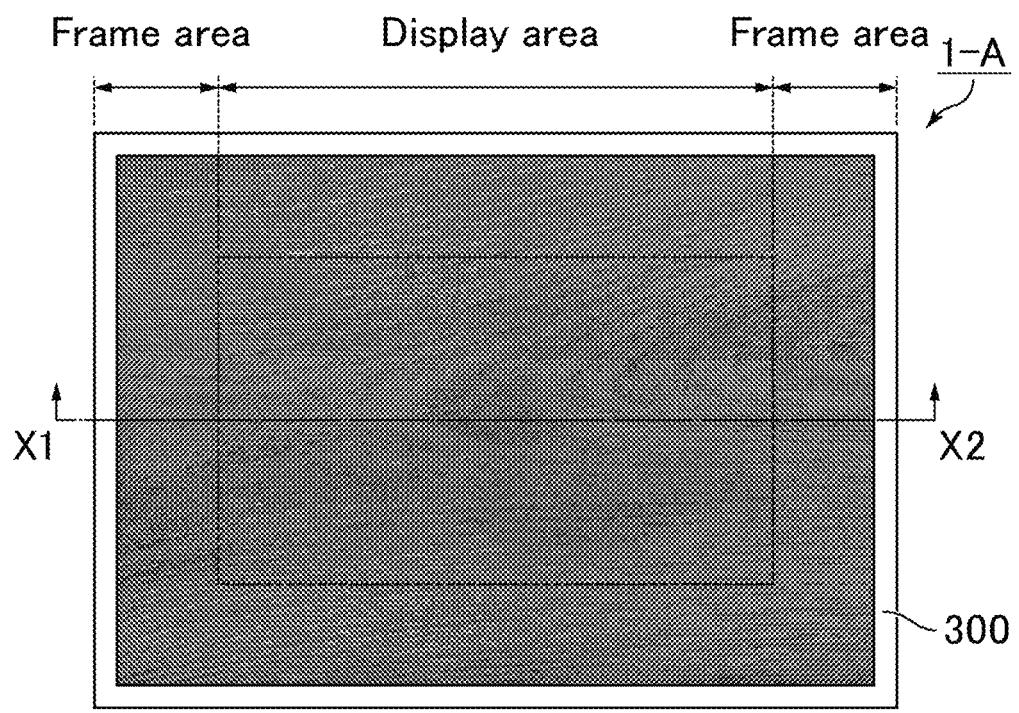
FIG. 1 is a schematic plan view illustrating an example of a display device according to a first embodiment.

Exemplifying embodiments below, the present invention will be described in more detail with reference to the drawings, but the present invention is not limited only to the embodiments. In the following description, the same reference numerals are appropriately used in different drawings for the same portions or portions having similar functions, and repeated descriptions thereof are appropriately omitted. Each aspect of the present invention may be appropriately combined without departing from the gist of the present invention.

In the present specification, the expression that two directions are orthogonal to each other means that an angle formed by the two directions is preferably within a range of 90°±3°, more preferably within a range of 90°±1°, still more preferably within a range of 90°±0.5°. In addition, the expression that two directions are parallel means that the angle formed by the two directions is preferably within a range of 0°±3°, more preferably within a range of 0°±1°, still more preferably within a range of 0°±0.5°.

In the present specification, an "observer side" refers to a surface on which an observer observes the display device, and is also referred to as a "front surface side". A "back surface side" refers to a surface opposite to the observer side.

First Embodiment

A display device according to a first embodiment includes: a liquid crystal panel; a front surface plate disposed on an observer side of the liquid crystal panel; and a backlight disposed on a back surface side of the liquid crystal panel. The liquid crystal panel includes, in plan view: a display area; and a frame area disposed around the display area, the front surface plate includes a design layer that overlaps the display area in plan view, and is configured to transmit at least a part of light incident from the liquid crystal panel and to reflect at least a part of light incident from the observer side, the backlight includes, in plan view: a third area that overlaps the display area of the liquid crystal panel; and a fourth area that overlaps the display area of the liquid crystal panel and is disposed around the third area, and a luminance of the fourth area is 50% or less of a luminance of the third area when the backlight is turned on. In the first embodiment, the backlight is so configured that a boundary between the display area and the frame area is less visually recognizable at the time of transmission display.

Figure 2:
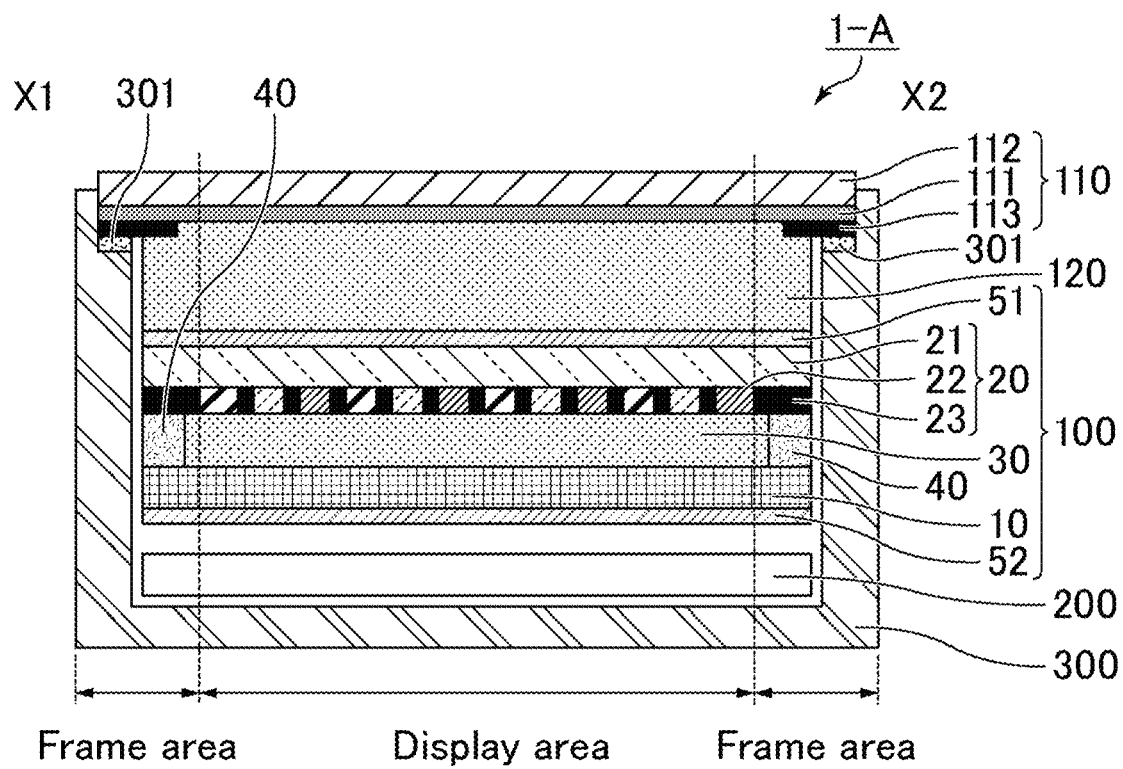
FIG. 2 is a schematic cross-sectional view taken along line X1-X2 in FIG. 1.

FIG. 1 is a schematic plan view illustrating an example of a display device according to a first embodiment. FIG. 2 is a schematic cross-sectional view taken along line X1-X2 in FIG. 1. As illustrated in FIG. 2, a display device 1-A according to the first embodiment includes: a liquid crystal panel 100; a front surface plate 110 disposed on an observer side of the liquid crystal panel 100; and a backlight 200 disposed on a back surface side of the liquid crystal panel 100. Configurations of the liquid crystal panel 100 and the front surface plate 110 will be described later.

As illustrated in FIG. 1, the liquid crystal panel 100 includes, in plan view: a display area; and a frame area disposed around the display area. In FIG. 1, a dotted line represents a boundary between the display area and the frame area of the liquid crystal panel, and an outer edge of a black matrix 23 illustrated in FIG. 2, inside the liquid crystal panel is the boundary between the display area and the frame area. The display area includes a plurality of pixels and displays a desired image and the like at the time of the transmission display. The frame area overlaps a casing and a bezel and is not involved in the transmission display.

Figure 3:
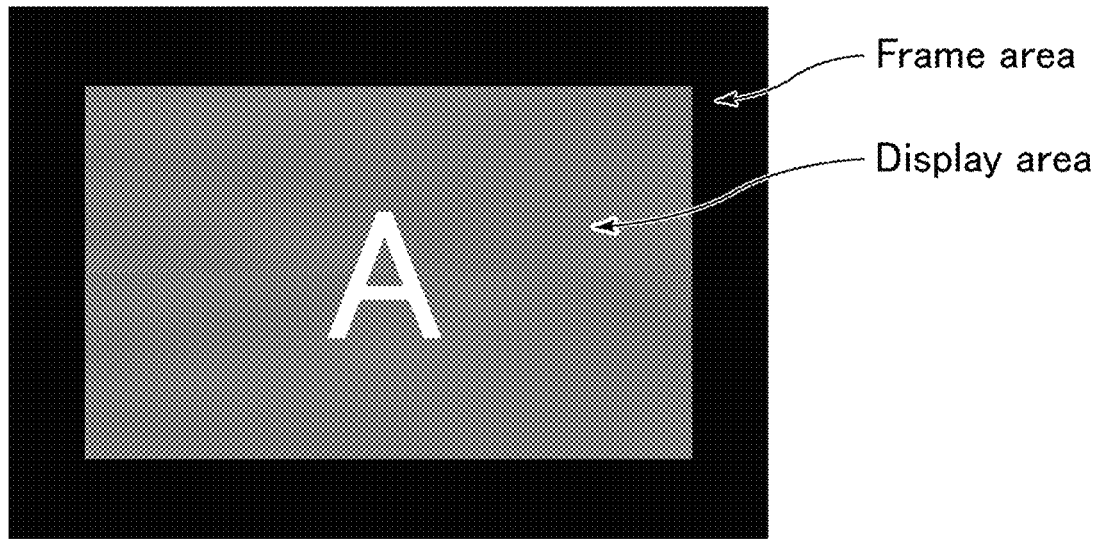
FIG. 3 is a reference drawing of a liquid crystal panel for describing black floating at the time of transmission display.
Figure 4:
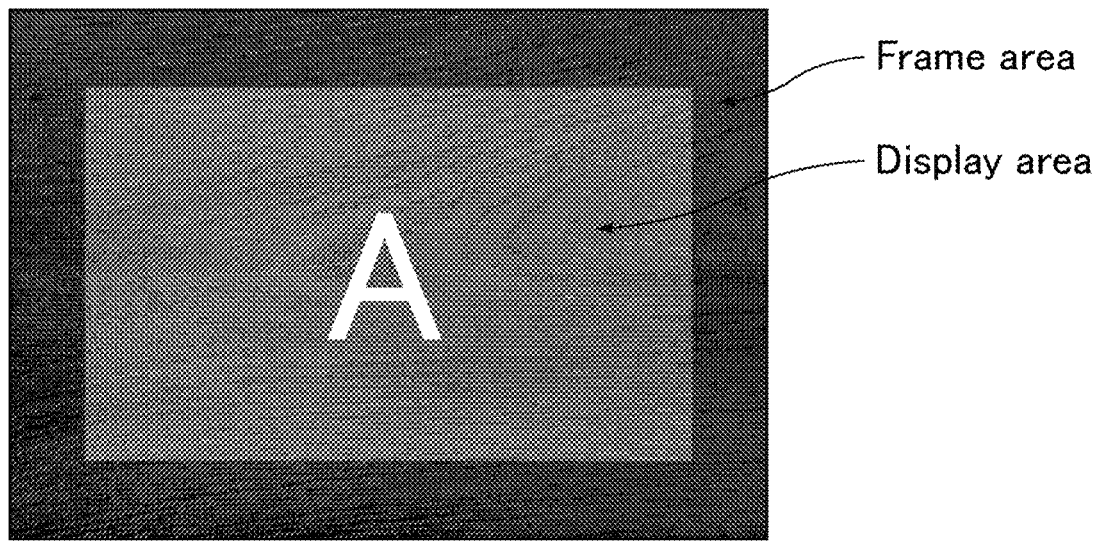
FIG. 4 is a reference drawing of a display device in which a front surface plate is superposed on the liquid crystal panel of FIG. 3.

Hereinafter, black floating will be described with reference to FIGS. 3 and 4. FIG. 3 is a reference drawing of a liquid crystal panel for describing the black floating at the time of the transmission display. FIG. 4 is a reference drawing of a display device in which a front surface plate is superposed on the liquid crystal panel of FIG. 3.

On the liquid crystal panel, even when black is displayed in the display area, black floating is observed in some cases. As illustrated in FIG. 3, a case is exemplified where alphabet A and the background of the character are respectively displayed in white and in black in the display area of the liquid crystal panel. Since the liquid crystal panel slightly transmits backlight light even in the black display state, black in the display area sometimes appears slightly brighter than perfect black (black floating). The black floating is expressed by a product of a transmittance of the liquid crystal panel in the black display state and a luminance of the backlight. A description is given using specific values as follows. The transmittance of the liquid crystal panel in the black display state is usually about 0.006%, and when the luminance of the backlight is assumed to be 10000 cd/m$^2$, the black floating is about 0.6 cd/m$^2$, and the black floating is quite visually recognizable as the difference from the black of the frame area. Even when the front surface plate is superposed on such a liquid crystal panel with black floating as illustrated in FIG. 4, the boundary between the display area and the frame area is visually recognized at the time of the transmission display.

In the first embodiment, in a state where the backlight is turned on, the luminance of the fourth area (iv) overlapping the frame area of the liquid crystal panel is 50% or less of the luminance of the third area (iii) overlapping the display area of the liquid crystal panel. Such a configuration enables the boundary between the display area and the frame area to be less visually recognizable at the time of the transmission display of the liquid crystal panel.

(Backlight)

Figure 5:
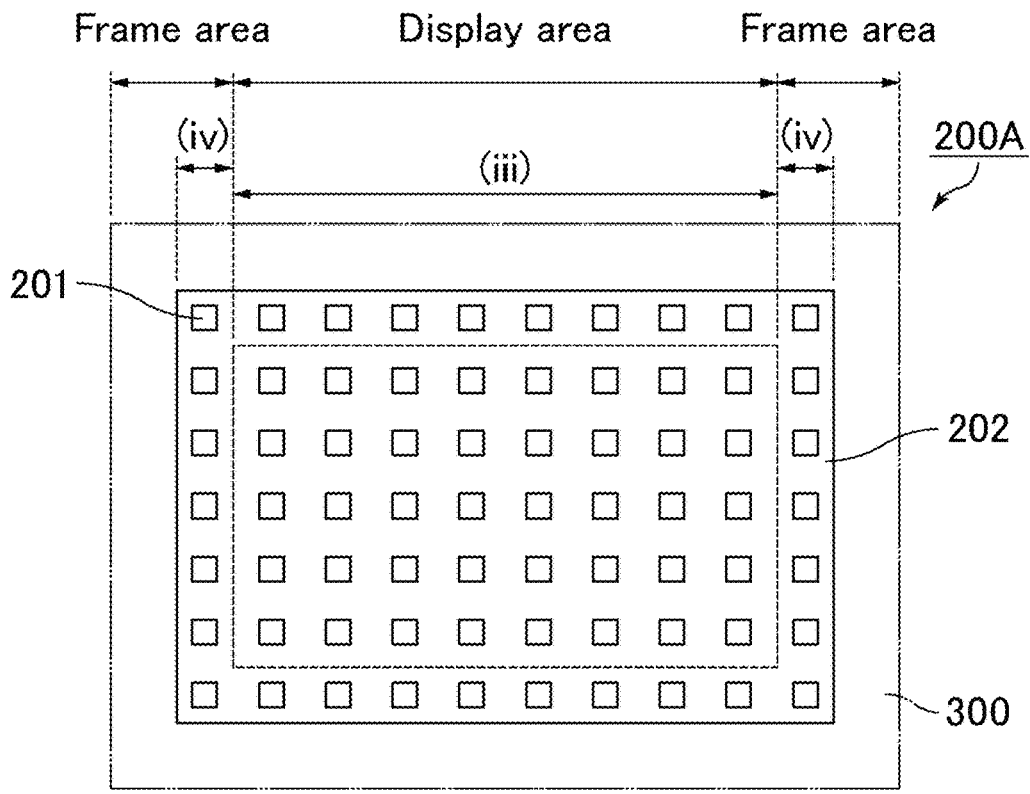
FIG. 5 is a schematic plan view of a direct type backlight used for the first embodiment.
Figure 6:
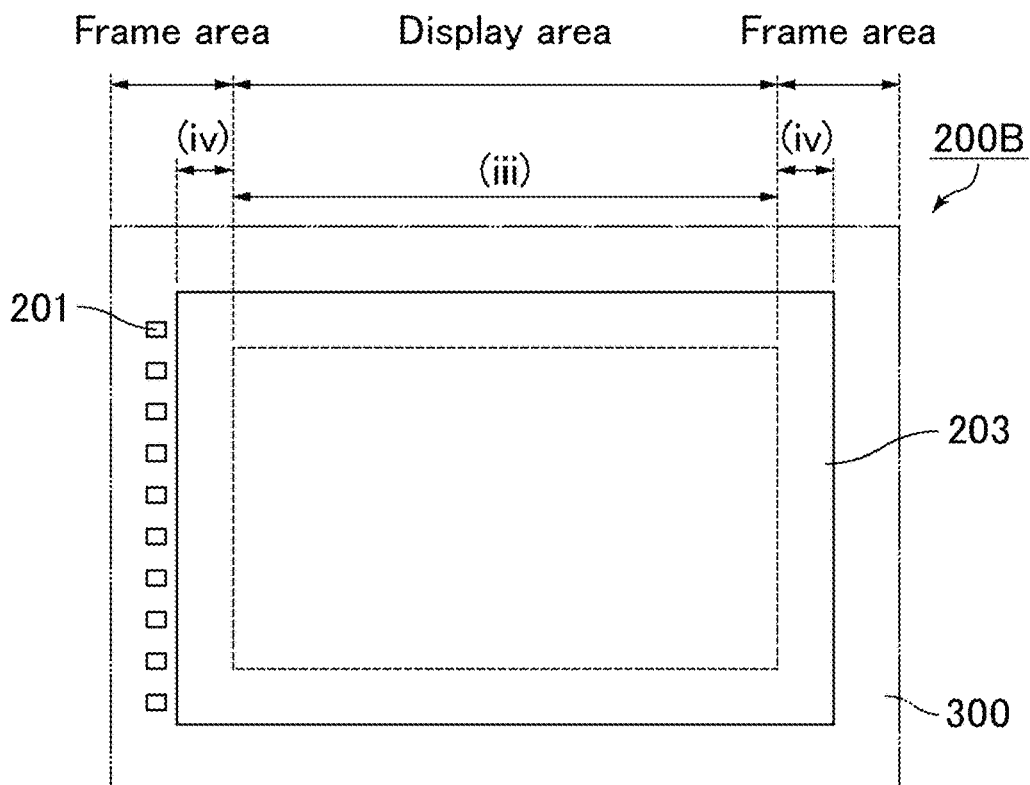
FIG. 6 is a schematic plan view of an edge light type backlight used for the first embodiment.

The above backlight may be a direct type backlight or may be an edge light type backlight. FIG. 5 is a schematic plan view of a direct type backlight used for the first embodiment. FIG. 6 is a schematic plan view of an edge light type backlight used for the first embodiment. In FIGS. 5 and 6, positions of the display area and the frame area of the liquid crystal panel are represented by two-dot chain lines for reference. As illustrated in FIGS. 5 and 6, backlights 200A and 200B each include, in plan view: a third area (iii) overlapping the display area of the liquid crystal panel; and a fourth area (iv). Furthermore, the fourth area (iv) is disposed around the third area (iii).

As illustrated in FIG. 5, the backlight may be a direct type backlight 200A in which a plurality of light emitting elements 201 are arranged in a matrix. The plurality of light emitting elements 201 may be arranged in an in-plane direction of a substrate 202. Although not illustrated, the backlight 200A may further include a diffusion film or another member. The substrate 202 is not limited, and a substrate known in the field of backlights can be used.

As the light emitting elements 201, light emitting elements known in the field of backlights can be used, and for example, light emitting diodes (LEDs) or other elements can be exemplified.

Preferably, the backlight 200A further includes a luminance adjustment mechanism that adjusts the luminance of the backlight, and the luminance adjustment mechanism adjusts the light emission intensity of each of the plurality of light emitting elements 201 in accordance with a display image of the liquid crystal panel 100. A driving method in which the light emission intensity of each of the plurality of light emitting elements 201 is adjusted in accordance with the display image of the liquid crystal panel 100 is also referred to as partial driving (local dimming).

The luminance adjustment mechanism preferably adjusts the luminance of the plurality of light emitting elements 201 arranged in the third area (iii) illustrated in FIG. 5 and the luminance of the plurality of light emitting elements 201 arranged in the fourth area (iv) such that the luminance of the fourth area of the backlight 200A is 50% or less of the luminance of the third area. When the display image of the liquid crystal panel 100 shows black, black floating can be reduced by turning off the light emitting elements 201 overlapping the area where the black is displayed.

As illustrated in FIG. 6, the backlight may be an edge light type backlight 200B including: a light guide plate 203 and light emitting elements 201 disposed on a side surface of the light guide plate 203. Although not illustrated, the backlight 200B may further include a reflective sheet, a diffusion film, or another member.

The light guide plate 203 is not limited, and a light guide plate known in the field of backlights can be used. A surface of the light guide plate 203 may be provided with irregularities, grooves, embosses, or another structure in order to emit, to the observer side, light incident from the light emitting elements 201 disposed on the side surface.

As illustrated in FIG. 6, a reflectance of the area overlapping the fourth area (iv) of the light guide plate 203 is preferably lower than the reflectance of the area overlapping the third area (iii). The luminance of the fourth area of backlight 200B is preferably adjusted to be 50% or less of the luminance of the third area by setting the reflectance of the area overlapping the fourth area (iv) to be lower than the reflectance in the area overlapping the third area (iii).

The reflectance of the light guide plate 203 can be adjusted by changing the density of structures such as the irregularities, grooves, embosses, or another structure. By making the density of the structure formed in the area overlapping the fourth area (iv) lower than the density of the structure formed in the area overlapping the third area (iii), it is possible to set the reflectance of the area overlapping the fourth area (iv) to be lower than the reflectance or the area overlapping the third area (iii).

Figure 7:
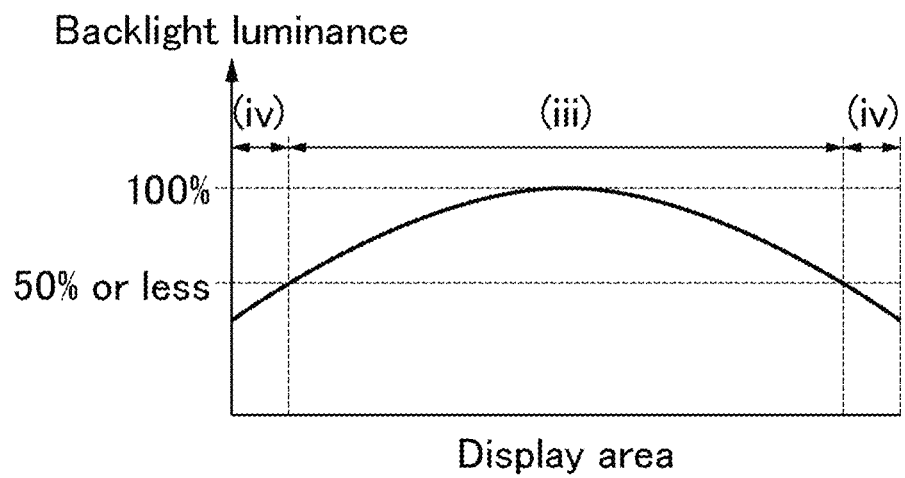
FIG. 7 is a graph exemplifying a luminance of a third area (iii) and a fourth area (iv) in the first embodiment.

FIG. 7 is a graph exemplifying the luminance of the third area (iii) and the fourth area (iv) in the first embodiment. As illustrated in FIG. 7, the luminance at the central part of the third area (iii) may be highest, and the luminance may become lower toward the outer edge of the fourth area (iv) (the boundary between the fourth area (iv) and the frame area). The boundary between the third area (iii) and the fourth area (iv) does not need to include a clear luminance boundary, and the luminance preferably changes gently. When the maximum luminance of the third area (iii) is assumed to be 100%, the luminance at the boundary between the third area (iii) and the fourth area (iv) is preferably 50% or less.

(Liquid Crystal Panel)

As illustrated in FIG. 2, the liquid crystal panel 100 may include: a pair of substrates; and a liquid crystal layer sandwiched between the pair of substrates. The pair of substrates may be a thin-film transistor (TFT) substrate 10 having switching elements such as a plurality of TFTs and a color filter (CF) substrate 20 including a color filter. The TFT substrate 10 and the CF substrate 20 are bonded to each other by a sealing material 40, and a liquid crystal layer 30 is sealed between the two substrates.

Although not illustrated, examples of the TFT substrate 10 include the following configuration. Gate lines and source lines intersecting the gate lines are provided on a support substrate, a TFT is disposed near each of the intersections of the gate lines and the source lines, and pixel electrodes are disposed to be electrically connected to respective ones of the TFTs. Each of areas surrounded by the gate lines and the source lines is a pixel.

The pixel electrodes and a counter electrode to be described later may be transparent electrodes, and can be formed of, for example, a transparent conductive material such as indium tin oxide (ITO), indium zinc oxide (IZO), zinc oxide (ZnO), tin oxide (SnO), or an alloy thereof.

The color filter substrate 20 may include, for example, a color filter layer 22 and a black matrix 23 disposed on a support substrate 21. The color filter layer 22 may include red, green, and blue color filters. Each of the color filters is disposed to overlap one of the pixels on the TFT substrate, and a desired color can be expressed by mixing the colors while controlling the amount of light transmitted through the color filter of each color.

The black matrix 23 may be disposed to partition each color filter in plan view. The color filters and the black matrix are not limited, and those known in the field of liquid crystal panels can be used.

The support substrates used for the TFT substrate 10 and the CF substrate 20 are each preferably a transparent substrate, and examples thereof include a glass substrate and a plastic substrate.

A display mode of the liquid crystal panel may be a vertical electric field system or may be a horizontal electric field system. Examples of the vertical electric field system include a vertical alignment (VA) mode in which liquid crystal molecules in the liquid crystal layer are aligned substantially vertical to the substrate surface when no voltage is applied. Examples of the horizontal electric field system include a fringe field switching (FFS) mode and an in-plane-switching (IPS) mode in which liquid crystal molecules in the liquid crystal layer are aligned substantially horizontally to the substrate surface when no voltage is applied. The expression "when no voltage is applied" includes a state where a voltage lower than a threshold value of the liquid crystal molecules is applied to the liquid crystal layer.

The expression "substantially horizontal" means that the tilt angle is 0° or more and 10° or less, preferably 0° or more and 5° or less, more preferably 0° or more and 2° or less. The expression "substantially vertical" means that the tilt angle is 83° or more and 90° or less, preferably 85° or more and 90° or less, and more preferably 87.5° or more and 88.0° or less.

The liquid crystal layer 30 controls a transmission amount of light by changing an alignment of liquid crystal molecules caused in accordance with an electric field, in the liquid crystal layer 30, generated by the voltage applied between each pixel electrode and the counter electrode. In the vertical electric field system, the counter electrode is disposed on the TFT substrate side, and in the horizontal electric field system, the counter electrode is disposed on the CF substrate side.

The liquid crystal molecules may have positive or negative dielectric constant anisotropy ($\Delta\varepsilon$) defined by the following formula (L).

$$\Delta\varepsilon=(\text{dielectric constant in major axis direction})-(\text{dielectric constant in minor axis direction}) \ (L)$$

As illustrated in FIG. 2, the liquid crystal panel 100 may include a first linearly polarizing plate 51 on the front surface side and a second linearly polarizing plate 52 on the back surface side. The first and second linearly polarizing plates 51 and 52 are each a polarizing plate that transmits only light in a specific polarization direction. The linearly polarizing plate may be an absorption type linearly polarizing plate that has a transmission axis to transmit only light in a specific polarization direction and have an absorption axis orthogonal to the transmission axis. Preferably, the first and second linearly polarizing plates 51 and 52 are disposed such that their transmission axes are orthogonal to each other. As the first and second linearly polarizing plates 51 and 52, known polarizing plates can be used, and examples of such polarizing plates include "TEG1465DU" manufactured by Nitto Denko Corporation.

Although not illustrated, the first linearly polarizing plate 51 may be attached to a surface, of the CF substrate 20, opposite to the liquid crystal layer 30 by a transparent adhesive, and the second linearly polarizing plate 52 may be attached to a surface, of the TFT substrate 10, opposite to the liquid crystal layer 30 by a transparent adhesive.

Although not illustrated, alignment films for controlling an alignment direction of the liquid crystal molecules when no voltage is applied may be disposed respectively between the TFT substrate 10 and the liquid crystal layer 30 and between the CF substrate 20 and the liquid crystal layer 30. As the alignment films, it is possible to use a general material in the field of liquid crystal panels such as a polymer including, in the main chain, polyimide, polyamic acid, or polysiloxane.

(Front Surface Plate)

The front surface plate 110 is a member that transmits at least a part of light incident from the liquid crystal panel 100 and reflects at least a part of light incident from the observer side.

A transmittance of the area, of the front surface plate 110, overlapping the display area of the liquid crystal panel 100 is preferably 50% or more. When the transmittance of the front surface plate 110 is 50% or more, the display device according to the first embodiment can perform the transmission display while keeping the luminance of the display device high. When the transmittance of the front surface plate 110 is less than 50%, the luminance of the display device is significantly reduced, and it is difficult to see the display image in a bright environment. In order to make the display image to be seen easily, it is necessary to increase the luminance of the backlight in order to increase the luminance of the display device, and the power consumption of the backlight therefore increases. The transmittance of the front surface plate 110 is more preferably 70% or more. The upper limit of the transmittance of the front surface plate 110 is, for example, 90%. In the present specification, the transmittance refers to a total light transmittance, and is measured by a method in accordance with JIS K 7361-1. The total light transmittance can be measured using, for example, a turbidimeter "Haze Meter NDH2000" manufactured by Nippon Denshoku Industries Co., Ltd. or other devices.

Conventionally, for example, in the printed matter described in JP 5725581 B, a smoke layer such as a transmissive smoke printed layer is disposed on the back surface side in order to reduce interface reflection. The smoke layer is a layer having a low transmittance and formed on the surface of a transparent substrate by solid printing or another method, and as an example, a layer having a transmittance of 70% or less is used. When the smoke layer is disposed on the back surface side of the front surface plate, the transmittance of the front surface plate is considered to be less than 50%. Preferable, a smoke layer is not disposed in the area, of the front surface plate 110, overlapping the display area of the liquid crystal panel 100, and in a case where the smoke layer is not disposed, it can be said that the transmittance of the area, of the front surface plate 110, overlapping the display area of the liquid crystal panel 100 is 50% or more.

In the display area of the liquid crystal panel, the transmittance from the observer side surface of the liquid crystal panel 100 (from the observer side surface of the first linearly polarizing plate 51 in FIG. 1) to the observer side surface of the front surface plate (the surface of a transparent base material 112 in FIG. 1) is preferably 50% or more, more preferably 70% or more.

The front surface plate 110 includes a design layer 111 overlapping the display area of liquid crystal panel 100 in plan view. The design layer 111 is a layer expressing a specific pattern or the like, which is visually recognized by an observer in a reflection display state. The specific pattern is not limited, and examples thereof include a geometric pattern having designability, a wood grain pattern, a specific character string, and a company logo.

The design layer 111 preferably includes a reflective pigment. The reflective pigment reflects light, of external light, of a specific wavelength to the observer side, and can allow the observer to visually recognize a specific color corresponding to the reflected wavelength. The specific wavelength is a wavelength in a visible light region (380 nm to 780 nm). The design layer 111 may include reflective pigments of a plurality of colors, and the reflected light of reflective pigments of the plurality of colors are additively mixed, so that a desired color can be visually recognized by an observer.

When the design layer 111 includes a reflective pigment, the front surface plate 110 can reflect at least part of the light incident from the observer side. Since the design layer 111 includes gaps between pigments, the front surface plate 110 can transmit at least part of light incident from the liquid crystal panel 100 to the observer side.

Examples of the reflective pigments include an interference pigment and a metal pigment.

The interference pigment is also called a pearl pigment, and may reflect light having a specific wavelength and transmit light having wavelengths other than the specific wavelength. Examples of the interference pigment include a pigment having a base material and a coating layer covering the base material.

As the base material, it is possible to use a thin piece transparent to light having a wavelength in the visible light region, and as the coating layer, it is possible to use a metal oxide film having a refractive index higher than the refractive index of the thin piece. The interference pigment is dispersed in a binder resin, and may be used by being applied onto a base film. it is possible to adjust the color of the interference light visually recognized by the observer, by changing the thickness of the coating layer. As the interference pigment, it is possible to use, for example, pigments described in JP 5725581 B.

When an interference pigment is used for the design layer 111, a part of external light is reflected at the interface between an air layer and the coating layer and the interface between the coating layer and the base material. The other part of the external light is transmitted through the base material and is reflected by the surface of the base film. The reflected lights are combined and visually recognized by the observer as pearl tone interference light of a specific color including the color of the base film.

The metal pigment may reflect light having a specific wavelength and absorb light having wavelengths other than the specific wavelength. Examples of the metal pigment include a pigment in which a metal piece is coated with a pigment, and the pigment may be further coated with a polymer such as an acrylic resin. Examples of the metal pigment include "FRIEND COLOR (registered trademark)" manufactured by Toyo Aluminium K.K.

As the metal piece, a metal that reflects visible light is preferable, and examples of the metal include aluminum, nickel, titanium, stainless steel, and alloys thereof.

The pigment covering the metal piece may be an organic pigment or an inorganic pigment, but an organic pigment is preferable. Examples of the organic pigment include phthalocyanine, halogenated phthalocyanine, quinacridone, diketopyrrolopyrrole, isoindolinone, azomethine metal complex, indanthurone, perylene, perinone, anthraquinone, dioxazine, benzoimidazolone, condensed azo, triphenylmethane, quinophthalone, and anthrapyrimidine. Examples of the inorganic pigment include titanium oxide, iron oxide, carbon black, and bismuth vanadate.

The design layer 111 may be a metal thin film, a film containing a pigment that reflects light, a printed layer that is printed with a pigment that reflects light, or the like.

Examples of the metal thin film include a thin film formed by processing metal such as aluminum, silver, titanium, or tungsten by a method such as metal vapor deposition or sputtering. A thickness of the metal thin film is, for example, 30 nm to 100 nm.

As another form of the design layer 111, for example, as described in JP 2001-331132 A and JP 6696014 B, a specific pattern may be formed on a screen having a plurality of fine holes or a decorative film having a plurality of transmission portions.

As illustrated in FIG. 2, the design layer 111 may be disposed on the back surface side of the transparent base material 112, or may be disposed on the front surface side of the transparent base material 112 although not illustrated. The design layer 111 only needs to be partially disposed on the surface of transparent base material 112 so that a specific pattern or the like can be expressed, and does not need to be disposed on the entire surface of the transparent base material 112.

As the transparent base material 112, a member that transmits light is preferably used, and the transparent base material 112 may be used as a printing base material of the design layer 111. From the viewpoint of keeping the luminance of the display device high, the transparent base material 112 preferably has a high transmittance, and the transmittance is preferably, for example, 90% or more. From the viewpoint of reducing blurring of the display image, the transparent base material 112 preferably has a haze of 10% or less. The haze is measured by a method in accordance with JIS K 7136. The haze can be measured using, for example, a turbidimeter "Haze Meter NDH2000" manufactured by Nippon Denshoku Industries Co., Ltd. or other devices.

As the transparent base material 112, it is possible to use, for example, a glass plate or a resin plate such as acrylic or polycarbonate. The transparent base material 112 may be a flat plane or may be a curved plane.

The design layer 111 may be printed on the surface of the transparent base material 112 by a printing method such as gravure printing, screen printing, or inkjet printing.

As illustrated in FIG. 2, in a case where the design layer 111 is disposed on the back surface side of the transparent base material 112, the design layer 111 can be prevented from being scratched. In a case where the transparent base material 112 is disposed on the observer side, a sense of depth and a sense of glossiness are provided. However, depending on the pattern of the design layer 111, the texture of the design layer may look inferior due to the sense of depth and the sense of glossiness. From the viewpoint that the texture of the design layer 111 can be expressed more vividly, the design layer 111 is preferably disposed on the front surface side of the transparent base material 112. On the other hand, when the design layer 111 is disposed on the front surface side of the transparent base material 112, the design layer 111 is easily scratched; therefore, a hard coat layer (not shown) may be further provided on the front surface side of the design layer 111.

The hard coat layer is preferably one having high transparency and scratch resistance, and examples of the hard coat layer include a coating layer of, for example, an acrylic resin or an epoxy resin. The hard coat layer preferably has, for example, a transmittance of 90% or more.

Figure 8:
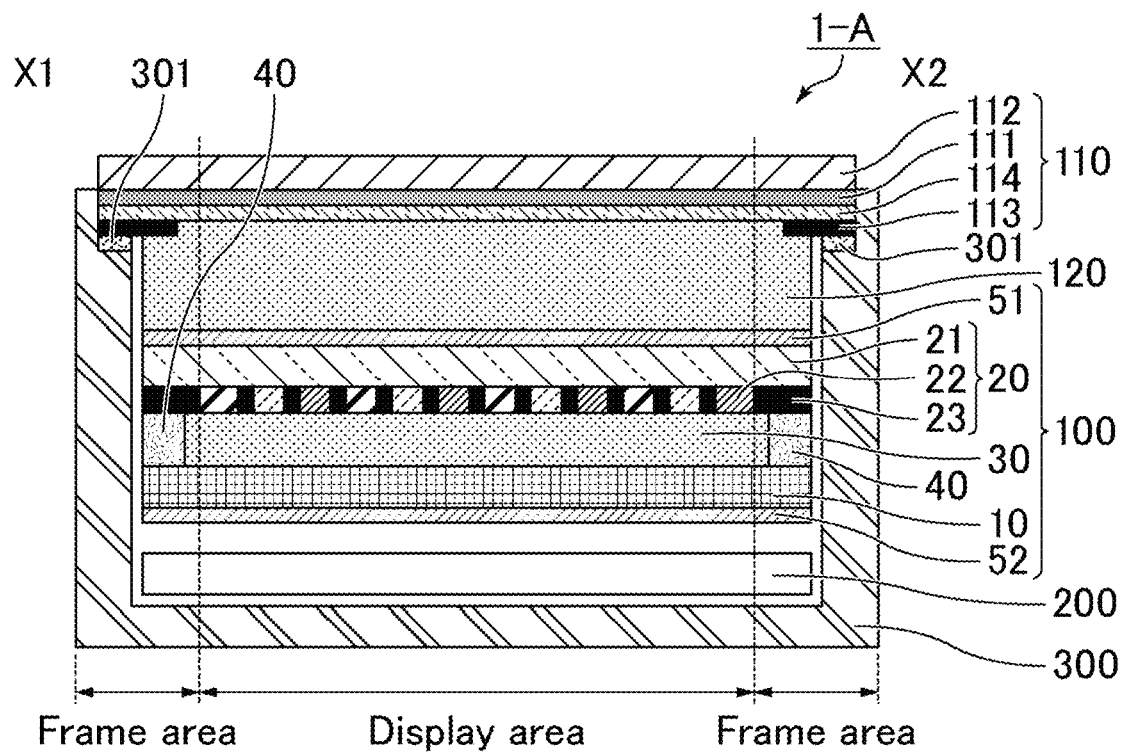
FIG. 8 is a schematic cross-sectional view of a display device exemplifying a case where the front surface plate includes a flattening layer.

FIG. 8 is a schematic cross-sectional view of a display device exemplifying a case where the front surface plate includes a flattening layer. As illustrated in FIG. 8, the front surface plate 110 may include a flattening layer 114 on the back surface side (liquid crystal panel 100 side) of the design layer 111. In a case where the design layer 111 is a printed layer obtained by, for example, screen printing, there may be irregularities of about 5 to 10 µm, depending on the pattern of the design layer 111. If the printed layer has irregularities, fine bubbles may enter between the front surface plate 110 and an optical adhesion layer 120, so that visibility of reflection display may be decreased. When the flattening layer 114 is disposed to flatten the surface, of the front surface plate 110, facing the optical adhesion layer 120 (for example, the surface has irregularities of 3 µm or less), it is difficult for bubbles to enter the irregularities, and the reflection display can look more brilliant.

The flattening layer 114 is preferably a transparent resin layer, and it is possible to use a transparent resin such as an acrylic resin or an epoxy resin. The flattening layer 114 can be formed by a method such as printing of the transparent resin. The flattening layer 114 preferably has a transmittance of 90% or more.

As illustrated in FIG. 2, the front surface plate 110 may include a black frame layer 113 on the back surface side of the design layer 111. The black frame layer 113 is a light shielding layer, and is preferably disposed in the area overlapping the area of liquid crystal panel 100 in plan view. The transparent base material 112 is preferably larger than the display area of the liquid crystal panel 100, and the black frame layer 113 may be disposed in the area, of the transparent base material 112, protruding from the display area (which area is the frame area). By disposing the black frame layer 113, it is possible to block stray light from the liquid crystal panel 100 side, thereby causing the design layer 111 to look brilliant. In addition, by disposing the black frame layer 113, it is possible to prevent the bezel, the frame, and the like from being seen through by the observer. An outer edge of black matrix 23 of the liquid crystal panel 100 and an outer edge of the black frame layer 113 may or may not coincide with each other.

As a material of the black frame layer 113, a material similar to the material of the black matrix 23 may be used, and the black frame layer 113 may be formed by a printing method such as a screen print method, using a black pigment or another material. The black frame layer 113 may be printed in solid so as to have substantially uniform transmittance, or may be gradation printed as described later. Alternatively, a black tape may be used.

Figure 9:
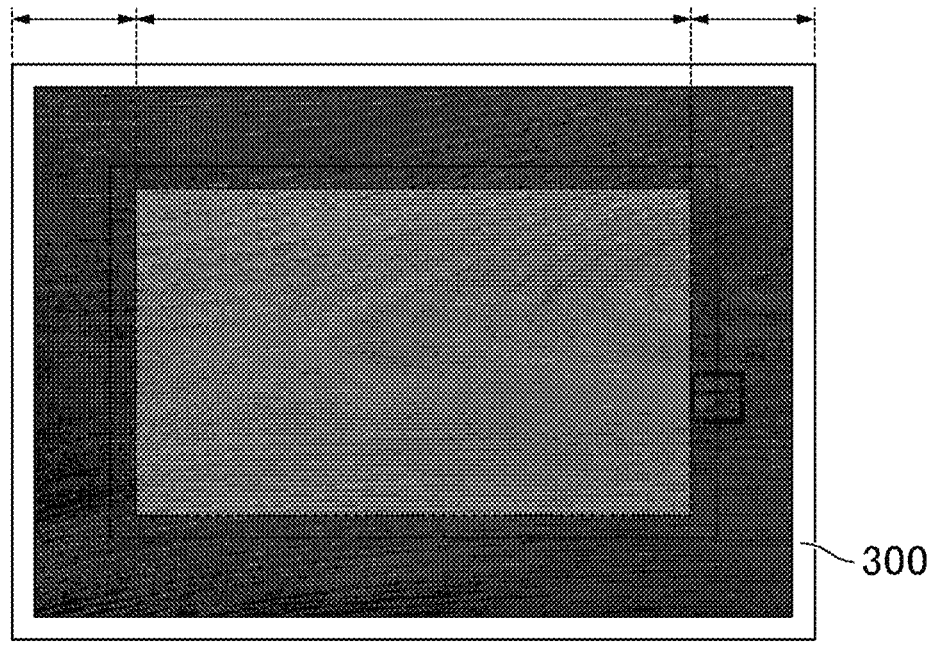
FIG. 9 is a schematic plan view of a display device illustrating, in an overlapping manner, a boundary between a display area and a frame area of a liquid crystal panel and an outer edge of a black frame layer.
Figure 10:
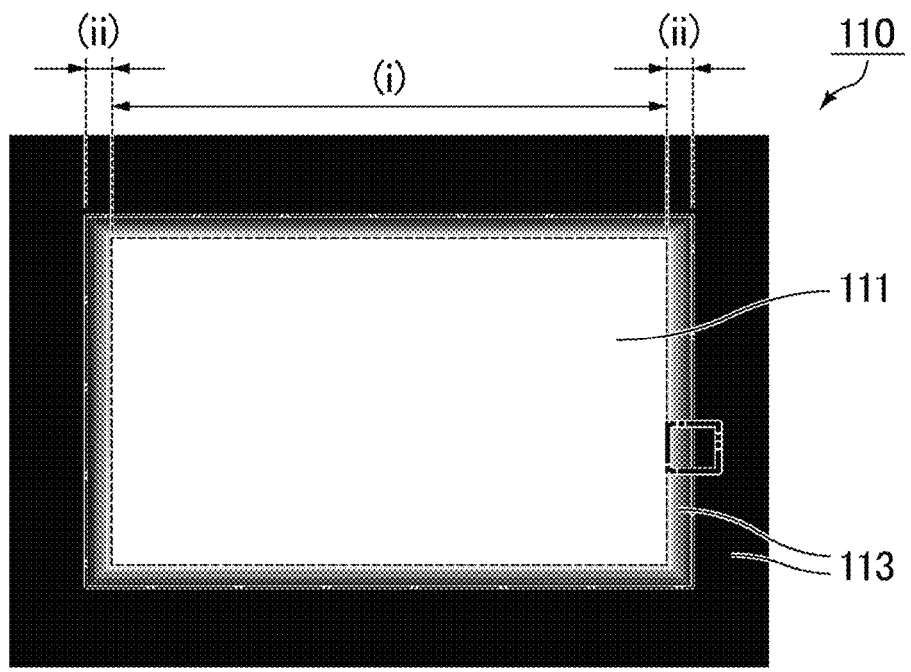
FIG. 10 is a schematic plan view illustrating an example of the black frame layer included in the front surface plate.

FIG. 9 is a schematic plan view of the display device illustrating, in an overlapping manner, the boundary between the display area and the frame area of the liquid crystal panel and the outer edge of the black frame layer. FIG. 10 is a schematic plan view illustrating an example of the black frame layer included in the front surface plate. In each of FIGS. 9 and 10, the dotted line represents the boundary between the display area and the frame area of the liquid crystal panel, and the alternate long and short dash line corresponds to the outer edge, of the black frame layer 113 illustrated in FIG. 2, inside the liquid crystal panel.

Even in a state where the liquid crystal panel is turned off, when the display device is observed from an oblique direction, the display area may appear slightly brighter than the frame area. By adjusting the reflectance of the front surface plate in an area in which the front surface plate overlaps the frame area of the liquid crystal panel, the boundary between the display area and the frame area can be made less noticeable even when the display device is observed from an oblique direction.

As illustrated in FIG. 10, the front surface plate 110 may include, in plan view: a first area (i) overlapping the display area of the liquid crystal panel; and a second area (ii) disposed around the first area (i). The second area (ii) of the front surface plate 110 may partially overlap or may not coincide with the frame area of the liquid crystal panel in plan view.

The second area (ii) preferably has a reflectance of 6% or more and 12% or less. The first area (i) of the front surface plate 110 overlaps the display area of the liquid crystal panel in plan view, and is disposed with the design layer 111. When the design layer 111 includes a reflective pigment, the reflectance of the first area (i) of the front surface plate 110 is about 10% or more in some cases. As illustrated in FIG. 2, the black frame layer 113 may be disposed in the area overlapping the frame area of the liquid crystal panel, and the black frame layer 113 is normally a light shielding member and has a reflectance of approximately 0%. By disposing the second area (ii) having a reflectance of 6% or more and 12% or less around the first area (i) of the front surface plate 110, the boundary between the display area and the frame area can be made less noticeable even when the display device is observed from an oblique direction.

The reflectance of the first area (i) and the reflectance of the second area (ii) are preferably substantially the same. For example, the difference between the reflectance of the first area (i) and the reflectance of the second area (ii) is preferably 15% or less, more preferably 5% or less, still more preferably 3% or less.

The reflectance of the second area (ii) preferably becomes higher from the outer edge inside the liquid crystal panel toward the first area (i). Specifically, in plan view, the black frame layer 113 is preferably disposed on an area that is on the back surface side of the design layer 111 of the front surface plate 110 and overlaps the frame area of the liquid crystal panel. Gradation printing may be performed on the front surface plate 110 in the second area (ii) such that the reflectance of the black frame layer 113 becomes higher toward the first area (i).

Figure 11:
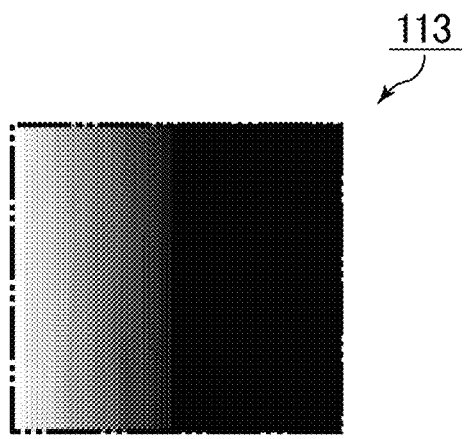
FIG. 11 is a first example of a schematic plan view in which a part of a second area illustrated in FIG. 10 is enlarged.
Figure 12:
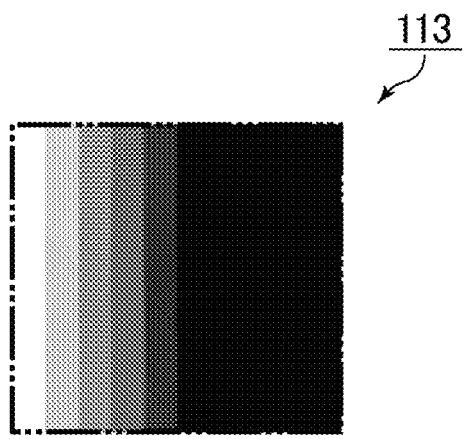
FIG. 12 is a schematic plan view of a second example in which a part of the second area illustrated in FIG. 10 is enlarged.
Figure 13:
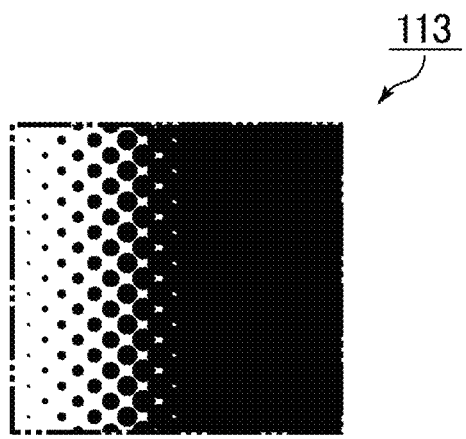
FIG. 13 is a schematic plan view of a third example in which part of the second area illustrated in FIG. 10 is enlarged.

FIGS. 11 to 13 are schematic plan views of respective ones of first to third examples, in which views a part of the second area illustrated in FIG. 10 is enlarged. FIGS. 11 to 13 correspond to a portion surrounded by a two-dot chain line in each of FIGS. 9 and 10. As long as the reflectance of the black frame layer 113 can be made to become higher toward the first area (i), the method for performing gradation printing on the black frame layer 113 is not limited, and for example, any of the following methods may be adopted: as illustrated in FIG. 11, a gradation of the black frame layer 113 is continuously changed; as illustrated in FIG. 12, the gradation of the black frame layer 113 is changed stepwise; and, as illustrated in FIG. 13, the gradation of the black frame layer 113 is changed by reducing areas of dots toward the first area (i).

(Optical Adhesion Layer)

The optical adhesion layer 120 is a transparent sticking layer or adhesive layer used for bonding optical members, and may be a sheet-like sticking layer or may be a solidified liquid adhesive.

The front surface plate 110 and the liquid crystal panel 100 are preferably bonded to each other by the optical adhesion layer 120. It can also be said that the front surface plate 110 and the liquid crystal panel 100 are integrated by the optical adhesion layer 120. That the front surface plate 110 and the liquid crystal panel 100 are bonded to each other by the optical adhesion layer 120 only means that there is no air layer between the front surface plate 110 including the design layer 111 and the liquid crystal panel 100; therefore, the front surface plate 110 and the liquid crystal panel 100 may each be in contact with the optical adhesion layer 120, or there may be a member other than the optical adhesion layer 120, for example, a transparent base material, between the front surface plate 110 and the liquid crystal panel 100.

When an air layer is not interposed between the front surface plate 110 and the liquid crystal panel 100, reflection at an air interface is eliminated, and an internal reflectance of the entire display device can be reduced. When the internal reflectance of the entire display device is reduced, colors of the pattern and the like of the design layer 111 does not become whitish in the reflection display, and clear and brilliant colors can be visually recognized. The display device 1-A according to the first embodiment can achieve brilliant reflection display without disposing a semi-transmissive smoke layer such as the transmissive smoke printed layer in JP 5725581 B. Furthermore, since the display device according to the embodiment does not include a smoke layer, the luminance at the time of the transmission display is not reduced, and it is possible to achieve both the brilliant reflection display and the high luminance transmission display.

The surface on the back surface side of the front surface plate 110 and the front surface side of the liquid crystal panel 100 are preferably in contact with the optical adhesion layer 120. The optical adhesion layer 120 may include a single layer or a stacked plurality of optical adhesion layers, but preferably includes a single layer.

The optical adhesion layer 120 preferably has a refractive index of 1.4 or more and 1.6 or less. The refractive index of the optical adhesion layer 120 is preferably larger than at least 1 (refractive index of air at 0° C. and 1 atm) and larger than refractive indices of the transparent base material 112 (in FIG. 2, the first linearly polarizing plate 51) and the front-side polarizing plate of the liquid crystal panel. By setting the refractive index of the optical adhesion layer 120 to 1.4 or more and 1.6 or less, it is possible to suppress that the transmitted light having passed through the design layer 111 returns to the observer side after being interface reflected. The interface reflected light of the transmitted light having passed through the design layer 111 has a complementary color relation with the light reflected by the design layer 111; therefore, it is possible to obtain more brilliant reflection display by reducing the interface reflected light.

A transmittance of the optical adhesion layer 120 is preferably 90% or more, and a haze of the optical adhesion layer 120 is preferably 10% or less. Examples of the optical adhesion layer 120 include "LUCIACS CS986" series manufactured by Nitto Denko Corporation.

By making the thickness of the optical adhesion layer 120 sufficiently larger than thicknesses of the design layer 111, the black frame layer 113, and the like, air bubbles can be prevented from entering at the time of bonding the liquid crystal panel 100 and the front surface plate 110. The thickness of the optical adhesion layer 120 is preferably 10 times or more the thickness of the black frame layer 113. For example, when the thickness of the black frame layer 113 is 20 μm, the thickness of the optical adhesion layer 120 is preferably 200 μm or more.

In addition, also in the case where the design layer 111 is disposed on the back surface side of the front surface plate 110, the thickness of the optical adhesion layer 120 is preferably 200 μm or more. By setting the thickness of the optical adhesion layer 120 to 200 μm or more, even when the design layer 111 has irregularities of 5 to 10 μm, it is possible to bond the design layer and the liquid crystal panel such that air bubbles do not enter between the design layer 111 and the liquid crystal panel.

(Casing)

The display device according to the first embodiment may further include a casing 300 that houses the liquid crystal panel 100 and the front surface plate 110. A double-sided tape 301 may be disposed on a back surface side of a part, of the front surface plate 110, overlapping the frame area (in FIG. 2, a back surface side of the black frame layer 113) so that the display device is fixed to casing 300. Inside the casing 300, there may be housed a component such as a circuit board (not illustrated) on which a drive circuit for driving the liquid crystal panel 100 and the backlight 200 is formed. The casing 300 is not limited as long as the casing 300 can house the liquid crystal panel 100 and the front surface plate 110, and the casing 300 may be made of metal or may be made of resin. The shape of the casing 300 is not limited to the shape illustrated in FIG. 2.

Figure 14:
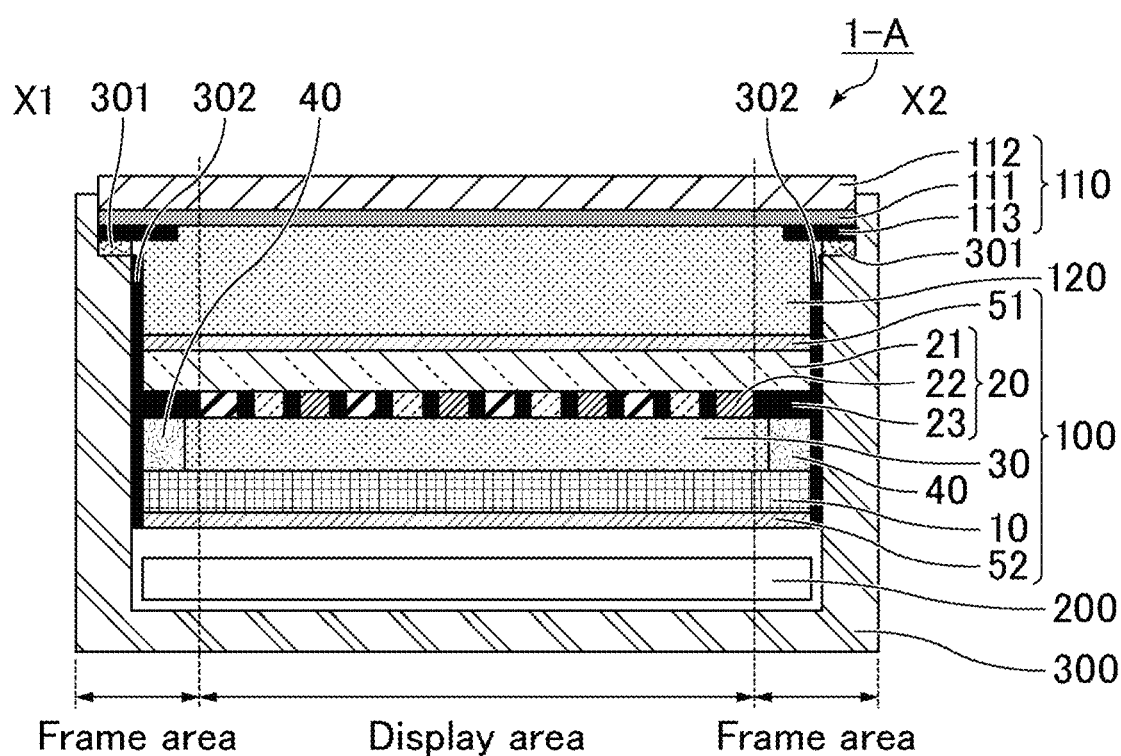
FIG. 14 is a schematic cross-sectional view of a display device exemplifying a case where a black layer is provided on side surfaces of a liquid crystal panel and/or inner walls of a casing.

FIG. 14 is a schematic cross-sectional view of a display device exemplifying a case where a black layer is provided on side surfaces of the liquid crystal panel and/or inner walls of the casing. As illustrated in FIG. 14, a black layer 302 that is a light shielding member may be provided on the side surfaces of the liquid crystal panel 100 and/or the inner surfaces (inner walls) of the casing 300. When the display device 1-A is viewed from an oblique direction, there is a case where the display area looks slightly bright due to stray light of the backlight 200, but when the black layer 302 is disposed, the stray light can be absorbed.

The black layer 302 may be formed by applying a black pigment, or may be formed by attaching a black-colored light shielding tape, a cushion member such as a black-colored sponge. From the viewpoint of obtaining also an effect of protecting the display device from impact, the cushion member is preferably disposed.

<Description of Display Method>

Figure 15:
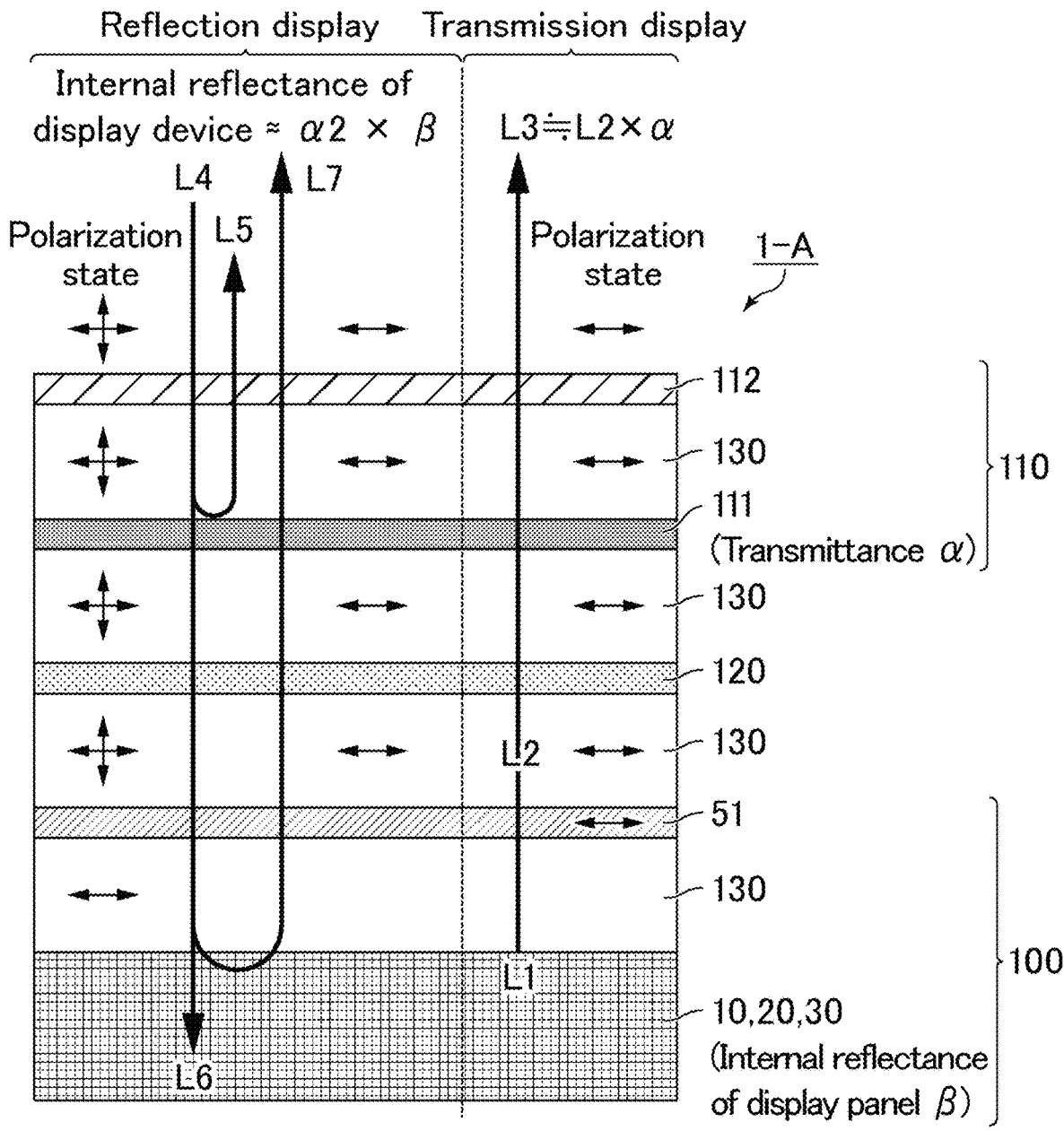
FIG. 15 is a schematic cross-sectional view illustrating a part of a configuration of a display device according to the first embodiment and a display method of the display device.

Hereinafter, with reference to FIG. 15, a display method of the display device according to the first embodiment will be described. FIG. 15 is a schematic cross-sectional view illustrating a part of the configuration and the display method of the display device according to the first embodiment. In FIG. 15, a double-headed arrow in one direction and double-headed arrows orthogonal to each other represent polarization states of light, and the double-headed arrow in one direction represents linearly polarized light in which a vibration direction of light is one direction. The orthogonal double-headed arrows represent unpolarized light. Hereinafter, a case is exemplified where the members are bonded to each other by adhesive layers 130, but the adhesive layers 130 may be omitted as long as the members are in close contact with each other such that no air layer is included between the respective members.

The display device according to the embodiment can perform the reflection display and the transmission display. In the present specification, the reflection display refers to a display method in which a pattern of the design layer is visually recognized by an observer due to reflection of the light incident on the display device from the observer side (due to reflection of external light). In the present specification, the transmission display refers to a display method in which the light (display light) emitted from the liquid crystal panel side is transmitted through the front surface plate and emitted to the observer side, thereby allowing the observer to visually recognize an arbitrary image or the like displayed on the liquid crystal panel.

The transmission display can be performed by turning on the backlight while the liquid crystal panel is in a white display state. The reflection display can be performed in a state where the liquid crystal panel is in the black display state and the backlight is turned on or off. The reflection display can be performed even when the liquid crystal panel is in the white display state, and for example, the reflection display can also be performed by turning off the backlight or reducing the backlight light to such an extent that the reflected light can enable the observer to visually recognize the pattern or the like of the design layer.

The black display state refers to a state in which the alignment direction of the liquid crystal molecules is substantially parallel to the transmission axis of the first linearly polarizing plate 51 or the second linearly polarizing plate 52. The white display state refers to a state in which the alignment direction of the liquid crystal molecules forms an angle with the transmission axis of the first linearly polarizing plate 51 or the second linearly polarizing plate 52 so that, when light is emitted from the backlight, the light can be transmitted to the observer side. When the alignment direction of the liquid crystal molecules forms an angle of 45° with the transmission axis of the first linearly polarizing plate 51 or the second linearly polarizing plate 52, the transmittance is maximized, and the luminance of the liquid crystal panel can be maximized (full white state).

As illustrated in FIG. 15, in the transmission display, light (L1) emitted from the observer side of the liquid crystal panel 100 is transmitted through the first linearly polarizing plate 51 disposed on the observer side of the liquid crystal panel 100. The light L1 is transmitted through the optical adhesion layer 120, the design layer 111, and the transparent base material 112, and is emitted to the observer side. When a luminance of the light after being emitted from the first linearly polarizing plate 51 is assumed as a liquid crystal panel luminance (L2) and a transmittance of the design layer 111 is assumed as $\alpha$, a luminance of light L3 emitted to the observer side (L3 is the luminance of the display device at the time of transmission display) is expressed by a formula: $L2 \times \alpha$. Although external light reflection described later occurs also in the transmission display, in a case where an amount of light emitted from the liquid crystal panel 100 side is sufficiently larger than an amount of external light, the design layer is less visually recognizable to the observer, and the observer can visually recognize an arbitrary image or the like displayed on the liquid crystal panel 100.

Next, the reflection display will be described. As illustrated in FIG. 15, when the light incident on the display device from the observer side is assumed as external light L4, a part of the light L4 is transmitted through the transparent base material 112, is reflected by the design layer 111, and is emitted to the observer side (L5). Another part of the light L4 is transmitted through the design layer 111, the optical adhesion layer 120, and the first linearly polarizing plate 51, and is incident on the liquid crystal panel 100. A part of the light incident on the liquid crystal panel 100 is absorbed by a color filter and the like inside the liquid crystal panel 100 (L6), and the other part is internally reflected by members such as conductive lines and electrodes constituting the liquid crystal panel 100, is transmitted through the design layer 111 again, and is emitted to the observer side (internally reflected light L7). Since the internally reflected light L7 passes through the design layer 111 twice, when an internal reflectance of the liquid crystal panel 100 is assumed as $\beta$, an internal reflectance of the display device is expressed by a formula: $\alpha^2 \times \beta$.

The transmittance $\alpha$ of the design layer 111 is a value that varies depending on the pattern formed on the design layer 111, and when the pattern is, for example, a wood grain, the transmittance $\alpha$ is about 60% to 80%. The internal reflectance $\beta$ of the liquid crystal panel 100 is a value obtained by subtracting a surface reflectance of the outermost surface of the liquid crystal panel 100 from the reflectance of the display area of the liquid crystal panel 100, in. Although depending on a density of the color filter, pixel design, and the like, the internal reflectance $\beta$ is usually about 1% to 2%. The internal reflectance of the liquid crystal panel is the reflectance between the TFT substrate 10 and the CF substrate 20 illustrated in FIG. 2, and does not include the reflectance of the first linearly polarizing plate 51 on the front surface side.

Since the display device according to the embodiment is not disposed with a smoke layer, the luminance of the display device at the time of transmission display decreases by the transmittance $\alpha$ of the design layer 111, and there is almost no decrease in luminance due to the members other than the design layer 111. Therefore, it is not necessary to increase the luminance of the liquid crystal panel 100 by using the backlight, and it is possible to reduce a power consumption and a heat generation amount. In addition, the liquid crystal panel 100 and the front surface plate 110 are preferably integrated into one piece by being bonded together by the optical adhesion layer 120. In this case, since the interface reflection does not occur between the liquid crystal panel 100 and the front surface plate 110, the internal reflectance of the display device at the time of the reflection display can be reduced to a product ($\alpha^2 \times \beta$) of the internal reflectance $\beta$ of the liquid crystal panel 100 and the amount corresponding to passing twice through the design layer 111 having the transmittance $\alpha$. The transmittance $\alpha$ and the internal reflectance $\beta$ can be measured using, for example, a spectrophotometer CM 5 manufactured by Konica Minolta, Inc. or other devices.

Regarding a display device in which the liquid crystal panel 100 and the front surface plate 110 are bonded to each other by the optical adhesion layer 120 as illustrated in FIG. 2, the luminance of the display device at the time of the transmission display and the internal reflectance of the display device at the time of the reflection display will be examined below, using reference forms.

<First Reference Form>

Figure 17:
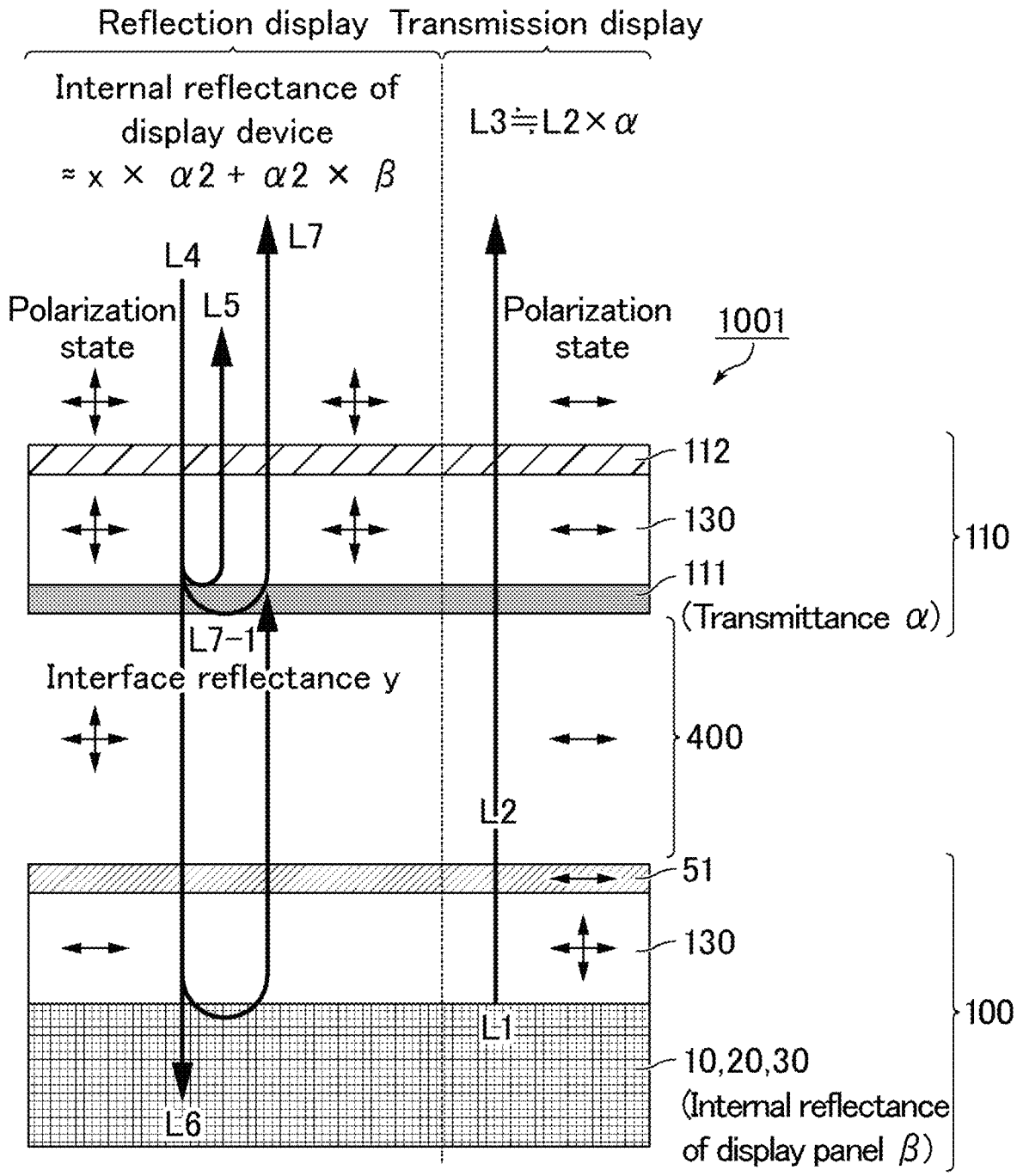
FIG. 17 is a schematic cross-sectional view illustrating a part of a configuration of a display device according to a first reference form and a display method of the display device.

FIG. 17 is a schematic cross-sectional view illustrating a part of a configuration and a display method of a display device according to a first reference form. A display device 1001 of the first reference form has the same configuration as that of FIG. 2 except that a liquid crystal panel 100 and a front surface plate 110 are not bonded by the optical adhesion layer 120 and an air layer 400 is provided between the liquid crystal panel 100 and the front surface plate 110.

As illustrated in FIG. 17, a luminance of the light L3 emitted to the observer side at the time of the transmission display is expressed by a formula: $L2 \times \alpha$, similarly to the description using FIG. 15.

Regarding the reflection display, the reflected light L5 of the external light L4 on the surface of the design layer 111 and the light L6 absorbed inside the liquid crystal panel are the same as those in the description using FIG. 15, and the description thereof is therefore omitted. Since the first reference form includes the air layer 400 between the liquid crystal panel 100 and the front surface plate 110, a part of the external light L4 is interface reflected at the boundary between the front surface plate 110 and the air layer 400 (L7-1). A part of the external light L4 incident on the liquid crystal panel is internally reflected by the members constituting the liquid crystal panel, is combined with the interface reflected light L7-1, and is emitted to the observer side (L7). When the interface reflectance is assumed as y, the internal reflectance of the display device of the first reference form is approximately expressed by a formula: $y \times \alpha^2 + \alpha^2 \times \beta$.

<Second Reference Form>

Figure 18:
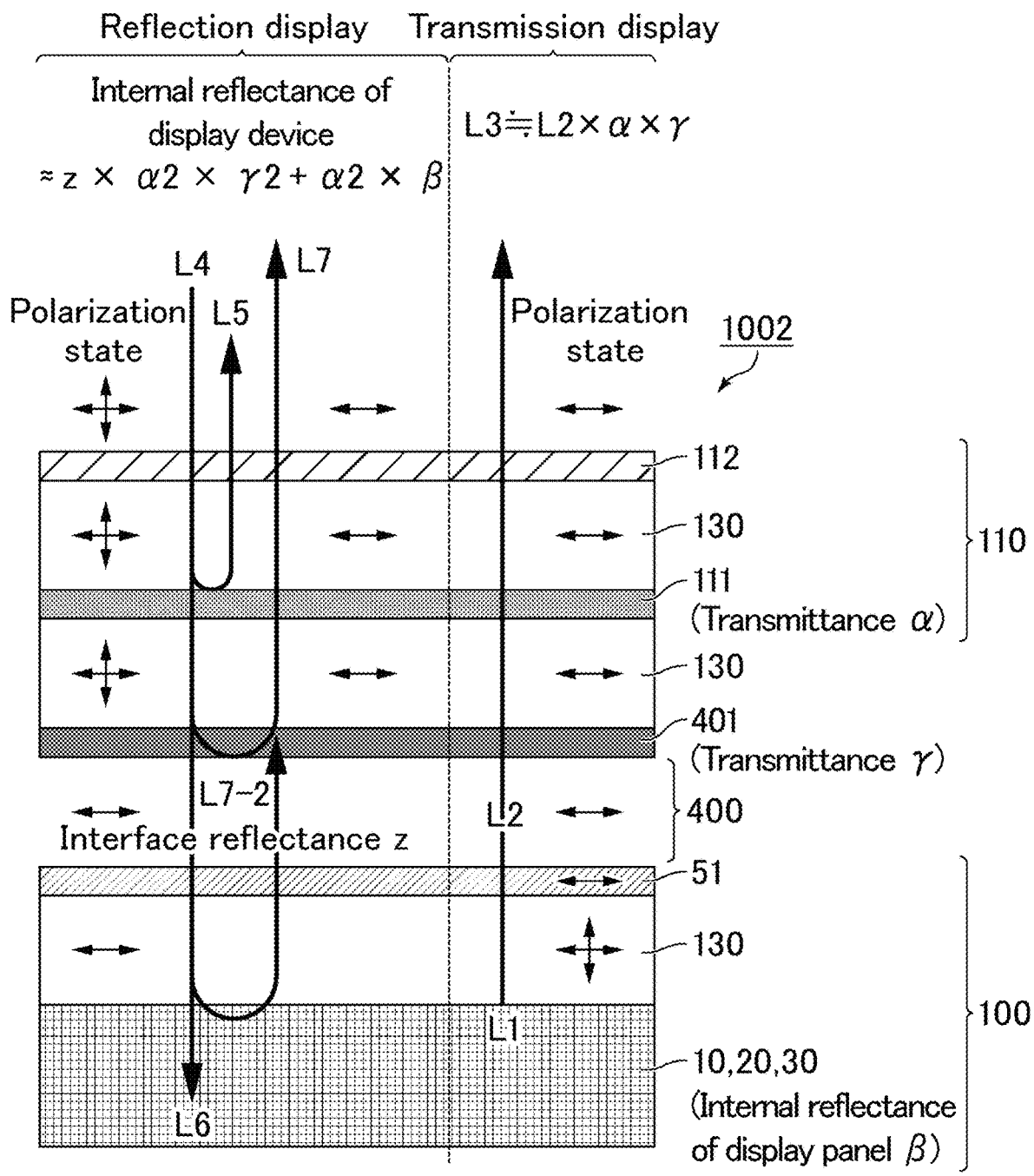
FIG. 18 is a schematic cross-sectional view illustrating a part of a configuration of a display device according to a second reference form and a display method of the display device.

FIG. 18 is a schematic cross-sectional view illustrating part of a configuration and a display method of a display device according to a second reference form. A display device 1002 of the second reference form has the same configuration as that of FIG. 2 except that a liquid crystal panel 100 and a front surface plate 110 are not bonded by the optical adhesion layer 120, that an air layer 400 is provided between the liquid crystal panel 100 and the front surface plate 110, and that a smoke layer 401 is disposed on the back surface side of a design layer 111.

The smoke layer 401 can be formed by, for example, applying a resin composition in which a black pigment is mixed with a transparent resin, to the back surface side of the front surface plate. The transmittance γ of the smoke layer 401 can be adjusted by the addition amount of the black pigment, and is, for example, 70% or less.

As illustrated in FIG. 18, in the second reference form, since the smoke layer 401 is disposed, when the transmittance of the smoke layer 401 is assumed as γ %, the luminance of the light L3 emitted to the observer side at the time of the transmission display is expressed by a formula: $L2 \times \alpha \times \gamma$.

Regarding the reflection display, the reflected light L5 of the external light L4 on the surface of the design layer 111 and the light L6 absorbed inside the liquid crystal panel are the same as those in the description using FIG. 15, and the description thereof is therefore omitted. Since the second reference form includes the air layer 400 between the liquid crystal panel 100 and the front surface plate 110, a part of the external light L4 is interface reflected at the boundary between the smoke layer 401 and the air layer 400 (L7-2). A part of the external light L4 incident on the liquid crystal panel is internally reflected by the members constituting the liquid crystal panel, is combined with the interface reflected light L7-2, and is emitted to the observer side (L7). When the interface reflectance is assumed as z, the internal reflectance of the display device of the second reference form is approximately expressed by a formula: $z \times \alpha^2 \times \gamma^2 + \alpha^2 \times \beta$.

Assuming $\alpha=70\%$, $\beta=1.5\%$, and $\gamma=70\%$, the following values were calculated with respect to the configuration of FIG. 2 and the first and second reference forms: the luminance of the light L3 emitted to the observer side at the time of the transmission display; and the internal reflectance of the display device at the time of the reflection display. The results of the calculation are summarized in the following Table 1.

TABLE 1

| | | Internal reflectance of display device during reflection display | Luminance of light L3 emitted to observer side during transmission display | |
|---|---|---|---|---|
| Configuration of FIG. 2 | $\alpha^2 \times \beta$ | 0.70% | $L2 \times \alpha$ | $\alpha = 70\%$ |
| First reference form | $y \times \alpha^2 + \alpha^2 \times \beta$ | 2.70% | $L2 \times \alpha$ | $\alpha = 70\%$ |
| Second reference form | $z \times \alpha^2 \times \gamma^2 + \alpha^2 \times \beta$ | 1.70% | $L2 \times \alpha \times \gamma$ | $\alpha \times \gamma = 49\%$ |

As shown in Table 1, since the internal reflectance is as low as 0.7% in the configuration illustrated in FIG. 2, the pattern of the design layer is not whitish in the reflection display and can therefore be made to look brilliant. In addition, since the luminance of the light L3 is also high, the display image can be displayed without being darkened in the transmission display.

On the other hand, in the first reference form, the internal reflectance of the display device is as high as 2.7%, and the external light is reflected more than in the configuration illustrated in FIG. 2, so that the pattern of the design layer looks whitish. In the second reference form, although the external light reflection is reduced as compared with the first reference form, the luminance of the light L3 is 49%, and the display image is darker in the transmission display.

Figure 19:
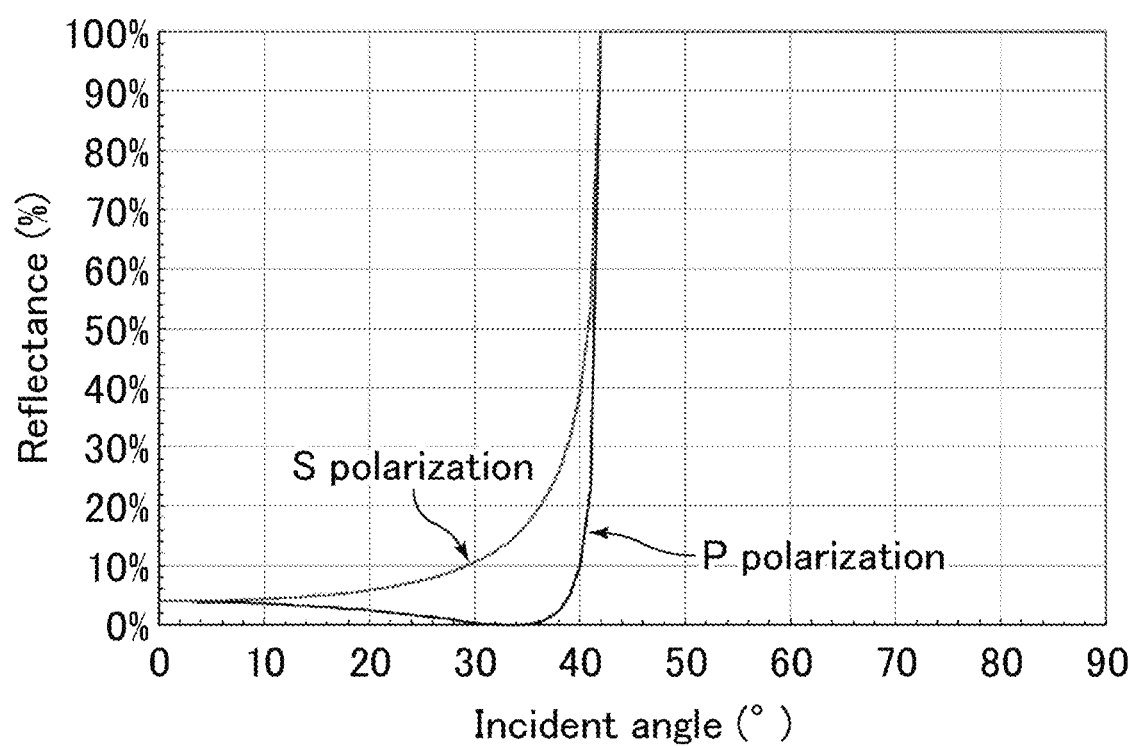
FIG. 19 is a graph illustrating an interface reflectance in a case where light is incident on a medium having a refractive index of 1 from a medium having a refractive index of 1.5.

FIG. 19 is a graph illustrating an interface reflectance in a case where light is incident on a medium having a refractive index of 1 from a medium having a refractive index of 1.5. The interface reflectance is derived from the Fresnel reflection equation, and is a function in accordance with the refractive index and the incident angle of the medium. FIG. 19 illustrate an example in which the normal direction of a medium such as the substrate is defined as 0° and the interface reflectance with respect to the incident light having an incident angle of 0° is 4%. Although the incident angle at which total reflection occurs is different between P polarization and S polarization, the interface reflectance increases as the incident angle increases. That is, when the display device is observed from an oblique direction, the difference in interface reflectance between the configuration illustrated in FIG. 2 and the first and second reference forms is larger than that when observed from the normal direction.

Second Embodiment

A display device according to a second embodiment includes: a liquid crystal panel; a front surface plate disposed on an observer side of the liquid crystal panel; and a backlight disposed on a back surface side of the liquid crystal panel, the liquid crystal panel including, in plan view: a display area; and a frame area disposed around the display area, the front surface plate including a design layer that overlaps the display area in plan view, and being configured to transmit at least a part of light incident from the liquid crystal panel and to reflect at least a part of light incident from the observer side, and a difference between a luminance of the display area of the liquid crystal panel and a luminance of the frame area in a black display state being 5% or less under 500 to 1000 lux. In the second embodiment, the backlight is so controlled that a boundary between the display area and the frame area at the time of the transmission display is less visually recognizable.

In the second embodiment, the difference between the luminance of the display area of the liquid crystal panel in the black display state and the luminance of the frame area is set to be substantially the same (5% or less) in a bright room (500 to 1000 lux), so that the boundary between the display area and the frame area of the liquid crystal panel can be made difficult to see. When the black frame layer 113 is disposed on the back surface side of the design layer 111 of the front surface plate 110 as illustrated in FIG. 2, the reflectance of the frame area overlapping the black frame layer 113 is about 6% to 12%.

The configuration of the front surface plate 110 except the black frame layer 113 can be the same as that of the first embodiment, and a duplicated description is therefore omitted. As the liquid crystal panel, the same liquid crystal panel as one used in the first embodiment can be used, and a duplicated description is therefore omitted.

The backlight used in the second embodiment is not limited, and a known backlight can be used. For example, it is possible to use an edge light type backlight in which a light source is disposed on an end surface of a light guide plate, or it is possible to use a direct type backlight in which a large number of light sources are disposed in a plane and a diffuser or the like is used to increase uniformity. With the second embodiment, the boundary between the display area and the frame area of the liquid crystal panel can be made difficult to see without using a backlight that includes areas having different luminances as described in the first embodiment.

The following configurations are exemplified as a specific example of a configuration in which the difference between the luminance of the display area of the liquid crystal panel in the black display state and the luminance of the frame area is made less than or equal to 5%.

In a first configuration of the second embodiment, the display device further includes a luminance adjustment mechanism that adjusts the luminance of the backlight, and the luminance adjustment mechanism performs control such that the backlight is turned on constantly in the reflection display in which light incident from the observer side is reflected to allow an observer to visually recognize a pattern of the design layer. Even in a state where a desired display image is not displayed on the liquid crystal panel (a state where the liquid crystal panel is not used), the boundary between the display area and the frame area of the liquid crystal panel can be made difficult to see by keeping the backlight turned on.

In the configuration in which the backlight is constantly turned on in the reflection display, the liquid crystal panel may be in the black display state (hereinafter, the driving method is also referred to as a driving method A). Alternatively, in the configuration in which the backlight is constantly turned on in the reflection display, the liquid crystal panel may be in a transmission state (hereinafter, the driving method is also referred to as a driving method B). From the viewpoint of being able to reduce power consumption, the driving method B (the liquid crystal panel is in the transmission state in the configuration in which the backlight is constantly turned on) is preferable.

The transmission state in the driving method B is preferably a state in which the luminance of the liquid crystal panel is the highest (full white state). In addition, in the driving method B, the liquid crystal panel is put in the full white state, and, at the same time, it is preferable that the backlight be slightly turned on. The expression "the backlight be slightly turned on" means that the luminance of the backlight is, for example, 5 to 10 cd/m$^2$.

Specifically, when the contrast of the liquid crystal panel is 1500 and the transmittance of the liquid crystal panel in the black display state is δ%, the transmittance of the liquid crystal panel in the white display state is expressed by a formula: 1500×δ%. For example, the same brightness is obtained by the following two methods: a driving method in which the backlight is turned on at 10,000 cd/m$^2$ to cause the liquid crystal panel in the black display state to perform display at the transmittance δ% (the driving method A); and a driving method in which the backlight is turned on at 6.7 cd/m$^2$ to cause the liquid crystal panel in the white display state to perform display at the transmittance of 1500×δ% (driving method B). That is, by using the driving method B, the same effect (luminance) can be obtained with about $\frac{1}{1500}$ of the power consumption of the driving method A. The driving method B is a particularly effective driving method for a smartphone or the like driven by a battery or the like.

When calculation is performed with respect to the driving method A and the driving method B using transmittances having more specific values, the calculation can be performed as follows.

Driving method A: The calculation formula is (transmittance in black state 0.0067%)×(backlight luminance 10000 cd/m$^2$)=0.67 cd/m$^2$ Driving method B: The calculation formula is (transmittance in the full white state 10%)×(backlight luminance 6.7 cd/m$^2$)=0.67 cd/m$^2$. The calculations mean that the driving method A and the driving method B provide the same luminance of the display device, but the driving method B only consumes $\frac{1}{1500}$ of the power consumption (standby power) as compared with the driving method A.

Also in the second embodiment, the transmittance of the area, of the front surface plate 110, overlapping the display area of the liquid crystal panel 100 is preferably 50% or more. That is, the smoke layer is preferably not disposed in an area, of the front surface plate 110, overlapping the display area of the liquid crystal panel 100. When the transmittance of the front surface plate 110 is 50% or more, the display device can perform transmission display while maintaining high luminance of the display device. The transmittance of the front surface plate 110 is more preferably 70% or more. The upper limit of the transmittance of the front surface plate 110 is, for example, 90%.

The front surface plate 110 and the liquid crystal panel 100 are preferably bonded to each other by the optical adhesion layer 120. When an air layer is not interposed between the front surface plate 110 and the liquid crystal panel 100, reflection at an air interface can be eliminated, and the internal reflectance of the entire display device can be reduced, so that brilliant reflection display can be achieved.

The optical adhesion layer 120 preferably has a refractive index of 1.4 or more and 1.6 or less. The above configuration makes it possible to suppress that the transmitted light having passed through the design layer 111 returns to the observer side after being interface reflected, so that brilliant reflection display can be achieved.

Third Embodiment

Figure 16:
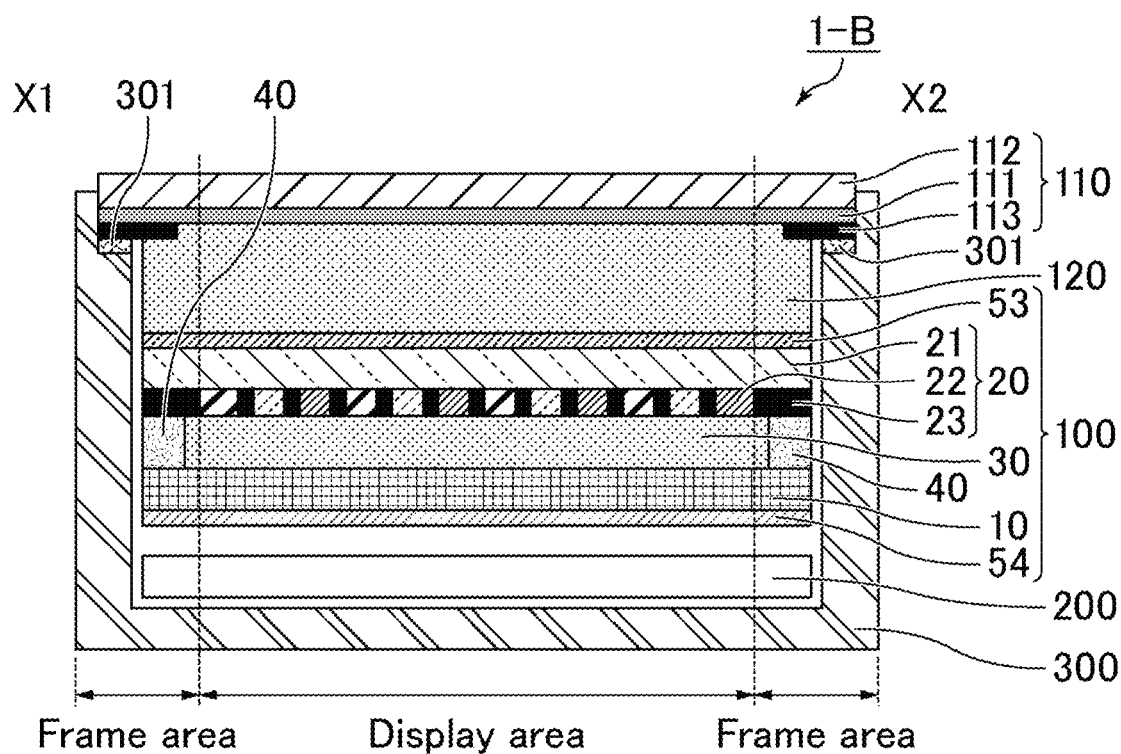
FIG. 16 is a schematic cross-sectional view illustrating an example of a display device according to a third embodiment.

FIG. 16 is a schematic cross-sectional view illustrating an example of a display device according to a third embodiment. As illustrated in FIG. 16, in a display device 1-B according to the third embodiment, a liquid crystal panel 100 includes a circularly polarizing plate 53 on a front surface plate 110 side. Since the circularly polarizing plate 53 is disposed on the front surface plate 110 side (front surface side) of the liquid crystal panel 100, the reflectance of a surface of the liquid crystal panel 100 can be substantially eliminated, so that internal reflectance can be greatly reduced. The present embodiment is the same as the first embodiment except that the circularly polarizing plate 53 is provided on the front surface plate 110 side, and a duplicated description is therefore omitted.

The circularly polarizing plate 53 is a polarizing element that converts incident light into circularly polarized light. The liquid crystal panel 100 may include a circularly polarizing plate 54 also on the back surface side. Examples of each of the circularly polarizing plates 53 and 54 include a polarizing plate in which a λ/4 wave plate and a linearly polarizing plate are stacked. A transmission axis of the linearly polarizing plate included in the circularly polarizing plate 53 and a transmission axis of the linearly polarizing plate included in the circularly polarizing plate 54 are preferably disposed to be orthogonal to each other.

The λ/4 wave plate is not limited as long as the wave plate gives a phase difference of ¼ wavelength to the incident light having the wavelength λ. The λ/4 wave plate is, for example, a retarder that gives an in-plane retardation of ¼ wavelength (strictly 137.5 nm) to light having a wavelength of 550 nm, and a retarder that gives a phase difference of 120 nm or more and 150 nm or less is preferable.

The λ/4 wave plate may have a fast axis and a slow axis orthogonal to the fast axis. The fast axis of the λ/4 wave plate may be disposed so as to form an angle of substantially 45° with the transmission axis of the third linearly polarizing plate. Substantially 45° is an angle preferably within a range of 45°±3°, more preferably within a range of 45°±1°, still more preferably within a range of 45°±0.5°.

When the liquid crystal panel 100 includes the circularly polarizing plate 53 on the front surface side, since transmittance modulation can be suitably performed, a display mode of the liquid crystal panel 100 is preferably a vertical electric field system such as a VA mode rather than a horizontal electric field system such as an IPS mode.

Examples of the configuration of the liquid crystal panel 100 include a configuration including, in order: a first substrate having a first electrode; a liquid crystal layer; and a second substrate having a second electrode. The first substrate may be the TFT substrate 10 described in the first embodiment, and the first electrode may be pixel electrodes formed on the TFT substrate 10. The second substrate may be the CF substrate 20 described in the first embodiment, and the second electrode may be a counter electrode disposed to face the pixel electrodes.

In a VA mode liquid crystal panel, the liquid crystal molecules included in the liquid crystal layer 30 preferably have negative dielectric constant anisotropy, and are preferably aligned substantially vertical to the TFT substrate 10 or the CF substrate 20 when no voltage is applied to the liquid crystal layer 30.

When the liquid crystal molecules are substantially vertically aligned when no voltage is applied as described above, the light (hereinafter, backlight light) emitted from a backlight 200 side is not transmitted to the observer side, and the liquid crystal panel 100 is in the black display state. When a voltage higher than or equal to a threshold value of the liquid crystal molecules is applied between a pixel electrode and the counter electrode, the liquid crystal molecules tilt from the substantially vertical direction, thereby transmitting the backlight light to the observer side, so that the white display state is established.

Also in the third embodiment, the transmittance of the area, of the front surface plate 110, overlapping the display area of the liquid crystal panel 100 is preferably 50% or more. The front surface plate 110 and the liquid crystal panel 100 are preferably bonded to each other by an optical adhesion layer 120. In addition, the optical adhesion layer 120 preferably has a refractive index of 1.4 or more and 1.6 or less.

Regarding a display device in which the liquid crystal panel 100 and the front surface plate 110 are bonded to each other by the optical adhesion layer 120 as illustrated in FIG. 16, the luminance of the display device at the time of the transmission display and the internal reflectance of the display device at the time of the reflection display will be examined below, using reference forms.

<Third Reference Form>

A third reference form is different from the configuration of FIG. 16 in the following point: a liquid crystal panel and a front surface plate are not bonded to each other by an optical adhesion layer, so that an air layer is provided between the liquid crystal panel and the front surface plate. A display method of the display device of the third reference form is described, replacing the first linearly polarizing plate 51 of the liquid crystal panel of the first reference form illustrated in FIG. 17 with a circularly polarizing plate.

<Fourth Reference Form>

A fourth reference form is different from the configuration of FIG. 16 in the following points: a liquid crystal panel and a front surface plate are not bonded to each other by an optical adhesion layer, so that an air layer is provided between the liquid crystal panel and the front surface plate; and a smoke layer is disposed on a back surface side of the design layer. A display method of the display device of the fourth reference form is described, replacing the first linearly polarizing plate 51 of the liquid crystal panel of the second reference form illustrated in FIG. 18 with a circularly polarizing plate.

Since a circularly polarizing plate is used in the configuration of FIG. 16 and in the third and fourth reference forms, the internal reflectance β of the liquid crystal panel is lower than that in the configuration of FIG. 2, so that β=0.5%. Assuming α=70%, β=0.5%, and γ=70%, the following values were calculated with respect to the configuration of FIG. 16 and the third and fourth reference forms: the luminance of the light L3 emitted to the observer side at the time of the transmission display; and the internal reflectance of the display device at the time of the reflection display. The results of the calculation are summarized in the following Table 2.

TABLE 2

|  | Internal reflectance of display device during reflection display | | Luminance of light L3 emitted to observer side during transmission display | |
|---|---|---|---|---|
| Configuration of FIG. 16 | $\alpha^2 \times \beta$ | 0.20% | $L2 \times \alpha$ | $\alpha = 70\%$ |
| Third reference form | $y \times \alpha^2 + \alpha^2 \times \beta$ | 2.20% | $L2 \times \alpha$ | $\alpha = 70\%$ |
| Fourth reference form | $z \times \alpha^2 \times \gamma^2 + \alpha^2 \times \beta$ | 1.20% | $L2 \times \alpha \times \gamma$ | $\alpha \times \gamma = 49\%$ |

The internal reflectance of the display device at the time of the reflection display of the configuration of FIG. 16 is 0.2%, and the reflection display more brilliant than in the configuration of FIG. 2 can be performed.

The display devices according to the first to third embodiments may be used, for example, as an instrument panel of an automobile, and may display instruments such as a speed meter and other meters, or may be used as an operation panel of a home appliance or the like.

REFERENCE SIGNS LIST

1-A, 1-B, 1001, 1002: display device
10: first substrate (TFT substrate)
20: second substrate (CF substrate)
21: support substrate
22: color filter layer
23: black matrix
30: liquid crystal layer
40: sealing material
51: first linearly polarizing plate
52: second linearly polarizing plate
53, 54: circularly polarizing plate
100: liquid crystal panel
110: front surface plate
111: design layer
112: transparent base material
113: black frame layer
114: flattening layer
120: optical adhesion layer
130: adhesive layer
200: backlight
200A: direct type backlight
200B: edge light type backlight
201: light emitting element
202: substrate
203: light guide plate
300: casing
301: double-sided tape
302: black layer
400: air layer
401: smoke layer

What is claimed is:

1. A display device comprising:
    a liquid crystal panel;
    a front surface plate disposed on an observer side of the liquid crystal panel; and
    a backlight disposed on a back surface side of the liquid crystal panel,
    the liquid crystal panel including, in a plan view: a display area; and a frame area disposed around the display area,
    the front surface plate including a design layer that overlaps the display area in the plan view, the front surface plate being configured to transmit at least a part of light incident from the liquid crystal panel and to reflect at least a part of light incident from the observer side,
    the backlight being an edge light type backlight including: a light guide plate; and a light emitting element disposed on a side surface of the light guide plate,
    the backlight including, in the plan view: a third area that overlaps the display area of the liquid crystal panel; and a fourth area that overlaps the display area of the liquid crystal panel and that is disposed around the third area,
    a luminance of the fourth area being 50% or less of a luminance of the third area when the backlight is turned on, and
    a reflectance of an area, on the light guide plate, overlapping the fourth area, being lower than a reflectance of an area, on the light guide plate, overlapping the third area.

2. The display device according to claim 1, wherein a transmittance of an area, of the front surface plate, overlapping the display area is 50% or more.

3. The display device according to claim 1, wherein the front surface plate and the liquid crystal panel are bonded to each other by an optical adhesion layer.

4. The display device according to claim 3, wherein the optical adhesion layer has a refractive index of 1.4 or more and 1.6 or less.

* * * * *